United States Patent
Rochette et al.

(10) Patent No.: US 10,643,343 B2
(45) Date of Patent: May 5, 2020

(54) STRUCTURED LIGHT MATCHING OF A SET OF CURVES FROM THREE CAMERAS

(71) Applicant: CREAFORM INC., Lévis (CA)

(72) Inventors: Félix Rochette, Québec (CA); Patrick Hébert, Québec (CA); Olivier Gignac, L'Ancienne-Lorette (CA); Martin Soucy, Québec (CA); Antoine Thomas Caron, Québec (CA)

(73) Assignee: Creaform Inc., Lévis, Quebec (CA)

( * ) Notice: Subject to any disclaimer, the term of this patent is extended or adjusted under 35 U.S.C. 154(b) by 0 days.

(21) Appl. No.: 16/382,067

(22) Filed: Apr. 11, 2019

(65) Prior Publication Data

US 2019/0236798 A1    Aug. 1, 2019

Related U.S. Application Data

(63) Continuation-in-part of application No. 15/114,563, filed as application No. PCT/IB2015/050856 on Feb. 4, 2015, now Pat. No. 10,271,039.

(Continued)

(51) Int. Cl.
    *G06K 9/32*     (2006.01)
    *G06T 7/593*    (2017.01)
    (Continued)

(52) U.S. Cl.
    CPC .......... *G06T 7/596* (2017.01); *G01B 11/2513* (2013.01); *G01B 11/2545* (2013.01);
    (Continued)

(58) Field of Classification Search
    None
    See application file for complete search history.

(56) References Cited

U.S. PATENT DOCUMENTS

| | | | |
|---|---|---|---|
| 5,135,309 A | 8/1992 | Kuchel et al. | |
| 5,307,151 A * | 4/1994 | Hof | .......... G06T 7/521 33/200 |

(Continued)

FOREIGN PATENT DOCUMENTS

| CN | 101089551 A | 12/2007 |
|---|---|---|
| CN | 101627280 A | 1/2010 |

(Continued)

OTHER PUBLICATIONS

Para-catadioptic camera auto-calibration from epipolar geometry, Branislav Micusik et al., CTU-CMP-2003-18, Nov. 24, 2003, pp. 1-6 (Year: 2003).*

(Continued)

Primary Examiner — Jayesh A Patel
(74) *Attorney, Agent, or Firm* — Pearl Cohen Zedek Latzer Baratz LLP

(57) ABSTRACT

A method for matching points between three images of a scene comprises retrieving three images acquired by a sensor, extracting blobs from said reflection in said two images; for each given extracted blob of the first image: selecting a selected epipolar plane; identifying plausible combinations; calculating a matching error; repeating the steps of selecting, identifying and calculating for each epipolar plane of the set of epipolar planes; determining a most probable combination; identifying matching points between the two images; validating the matching points between the two images, said validating comprising for each pair of matching points, determining a projection of the pair of matching points in a third image of the third camera; and providing the validated pairs of matching points.

6 Claims, 18 Drawing Sheets

Related U.S. Application Data

(60) Provisional application No. 61/936,033, filed on Feb. 5, 2014.

(51) Int. Cl.

| | | |
|---|---|---|
| *G06K 9/00* | (2006.01) | |
| *G06T 7/521* | (2017.01) | |
| *H04N 13/243* | (2018.01) | |
| *H04N 13/254* | (2018.01) | |
| *G01B 11/25* | (2006.01) | |
| *G06K 9/46* | (2006.01) | |
| *G06T 7/30* | (2017.01) | |

(52) U.S. Cl.
CPC ....... *G06K 9/00214* (2013.01); *G06K 9/4609* (2013.01); *G06T 7/30* (2017.01); *G06T 7/521* (2017.01); *H04N 13/243* (2018.05); *H04N 13/254* (2018.05); *G06T 2207/10021* (2013.01); *G06T 2207/10028* (2013.01)

(56) References Cited

U.S. PATENT DOCUMENTS

| | | | | |
|---|---|---|---|---|
| 5,383,013 | A * | 1/1995 | Cox | G06T 7/593 356/2 |
| 5,432,712 | A * | 7/1995 | Chan | G01C 11/06 382/191 |
| 5,589,942 | A * | 12/1996 | Gordon | G01B 11/2545 250/558 |
| 5,867,591 | A * | 2/1999 | Onda | G01C 11/06 382/154 |
| 6,167,151 | A * | 12/2000 | Albeck | G06K 9/00201 345/419 |
| 6,661,913 | B1 * | 12/2003 | Zhang | G06K 9/209 345/419 |
| 6,664,531 | B2 * | 12/2003 | Gartner | G01B 11/245 250/208.1 |
| 7,251,356 | B2 * | 7/2007 | Seo | G06T 7/593 382/154 |
| 7,487,063 | B2 * | 2/2009 | Tubic | G01B 21/045 345/418 |
| 7,912,673 | B2 * | 3/2011 | Hebert | G01B 11/245 356/603 |
| 7,961,934 | B2 * | 6/2011 | Thrun | G01B 21/20 382/107 |
| 8,032,327 | B2 * | 10/2011 | Hebert | G01B 11/245 356/603 |
| 8,538,166 | B2 * | 9/2013 | Gordon | G01B 11/25 382/201 |
| 8,836,766 | B1 * | 9/2014 | Hebert | G06T 5/006 348/46 |
| 61,936,033 | | 2/2015 | Tubic | |
| 9,675,504 | B2 * | 6/2017 | Myers | A61F 15/004 |
| 10,271,039 | B2 * | 4/2019 | Tubic | G06K 9/4609 |
| 10,309,770 | B2 * | 6/2019 | Zheng | G01B 11/2545 |
| 2006/0192925 | A1 * | 8/2006 | Chang | G03B 21/14 353/94 |
| 2007/0285554 | A1 * | 12/2007 | Givon | G03H 1/268 348/340 |
| 2009/0067749 | A1 * | 3/2009 | Schiewe | H04N 9/3185 382/294 |
| 2010/0134598 | A1 | 6/2010 | St-Pierre et al. | |
| 2010/0135550 | A1 * | 6/2010 | Arnon | A61B 5/015 382/128 |
| 2011/0122229 | A1 * | 5/2011 | Cinquin | A61B 1/00193 348/47 |
| 2011/0134225 | A1 * | 6/2011 | Saint-Pierre | G01B 11/03 348/47 |
| 2013/0095920 | A1 * | 4/2013 | Patiejunas | G06T 15/00 463/31 |
| 2015/0049345 | A1 * | 2/2015 | Miyagawa | G01B 11/002 356/625 |
| 2016/0212418 | A1 * | 7/2016 | Demirdjian | H04N 17/002 |
| 2017/0039756 | A1 * | 2/2017 | Moule | G01B 11/25 |
| 2018/0211373 | A1 * | 7/2018 | Stoppa | G06T 7/55 |

FOREIGN PATENT DOCUMENTS

| | | |
|---|---|---|
| CN | 102042814 A | 5/2011 |
| CN | 102112845 A | 6/2011 |
| CN | 102175182 A | 9/2011 |
| CN | 106403845 | 2/2017 |
| DE | 41 30 237 A1 | 3/1993 |
| DE | 10 2013 208 466 A1 | 11/2014 |
| EP | 1649423 | 4/2006 |
| EP | 2618102 A2 | 7/2013 |
| EP | 310 2908 B1 | 12/2018 |
| JP | 2011 530071 A | 10/2012 |
| JP | 2013 210254 A | 10/2013 |
| WO | WO2004/088245 A1 | 10/2004 |
| WO | WO 2005/010825 A1 | 2/2005 |
| WO | WO 2008/046663 A2 | 4/2008 |
| WO | WO 2008/135294 A1 | 11/2008 |
| WO | WO 2010/015086 | 2/2010 |
| WO | WO 2010/015086 A1 | 2/2010 |
| WO | WO2010/015086 A1 | 2/2010 |
| WO | WO 2011/053319 A1 | 5/2011 |
| WO | WO 2013/145655 | 10/2013 |
| WO | WO 2013/145665 A1 | 10/2013 |
| WO | WO 2015/118467 A1 | 8/2015 |

OTHER PUBLICATIONS

Automated trinocular stereo imaging system for three-dimensional surface wave measurements, Justin M. Wanek et al., Elsevier, 0029-8018, 2005, pp. 723-747 (Year: 2005).*

Epipolar line Estimation and Rectification for Stereo Image Pairs, DVPapadimitriou et al., IEEE, vol. 5 No. 4, ,1996, pp. 672-676 (Year: 1996).*

A robust technique—epipolar Geometry, Zhengyou Zhang et al., Elsevier, 0004-3702, 1995, pp. 87-119 (Year: 1995).*

Blais, "A Review of 20 Years of Range Sensor Development", Journal of Electronic Imaging, Jan. 2004, pp. 231-243, vol. 13(1) NRC.

Longuet-Higgins, A computer algorithm for reconstructing a scene from two projections, Nature, Sep. 10, 1981, pp. 133-135, vol. 293,1981 Macmillan Journals Ltd, USA.

Kawasaki et al., Dynamic scene shape reconstruction using a single structured light pattern, IEEE Conference on Computer Vision and Pattern Recognition, Jun. 23-28, 2008, 9 pages, IEEE, USA.

Sagawa et al., Dense 3D reconstruction method using a single pattern for fast moving object, 2009 IEEE 12$^{th}$ International Conference on Computer Vision, Sep. 29-Oct. 2, 2009, 9 pages, IEEE, USA.

Kasuya et al., Robust and Accurate one-shot 3D Reconstruction by 2C1P System with Wave Grid Pattern, 2013, International Conference on 3DTV-Conference, Jun. 29-Jul. 1, 2013,9 pages, IEEE, USA.

Tornslev, 3D scanning using multi beam laser, Master Thesis IMM-Thesis-2005-83, 2005, 13 pages, Technical University of Denmark, Lyngby, Denmark.

Bruno et al., Experimentation of structured light and sterio vision for underwater 3D reconstruction, ISPRS Journal of Photogrammetry and Remote Sensing, 2011, pp. 508-518, vol. 66, Issue 4, Elsevier.

Zhang, G.x., et al., "A Trinocular Vision Probe for Sculptured Surface Measurements", State Key Laboratory of Precision Measuring Technology and Instruments, Tianjin University, China, Proceedings ASPE Summer Topical Meeting on Coordinate Measuring Machines, Jun. 26, 2003 (available at http://www.aspe.net/publications/Summer_2003/Summer_03.html).

Ernst, V.G.S., et al., A Surface Relief Meter Based on Trinocular Vision, University of Twente, The Netherlands, and Institute of Agricultural and Environmental Engineering (IMAG-DLO), The Netherlands, Conference on Image Processing and Its Applications, Jul. 4-6, 1995, Conference Publication No. 410, © IEE 1995.

(56) References Cited

OTHER PUBLICATIONS

Office Action for Chinese Patent Application No. 201580007340X, dated Jul. 4, 2018.
Office Action for Japanese Patent Application No. JP2016-547542, dated Sep. 11, 2018.
Zhang, G. X. et al., "A trinocular vision probe for sculptured surface measurements". Proceedings ASPE summer tropical meeting on coordinate measuring machines, 2003.
Kim, Min Young et al., "A 3D sensor system using multi-stripe laser and stereo camera for environment recognition of mobile robots". Optomechatronic Systems III, vol. 4902, 2002.
Wikipedia Article "Epipolargeometrie" (epipolar geometry) Feb. 06, 2020.
Zhou, Sikan et al., "Raster Scanning Technology Used in Reverse Engineering", pgs. 69-71, 2004.
Tomio Echigo, et al., A Fast Method for Extraction of 3-D Information Using Multiple Stripes and Two Cameras, Proceedings of the 9th international joint conference on Artificial intelligence, vol. 2, Jan. 1985.

\* cited by examiner

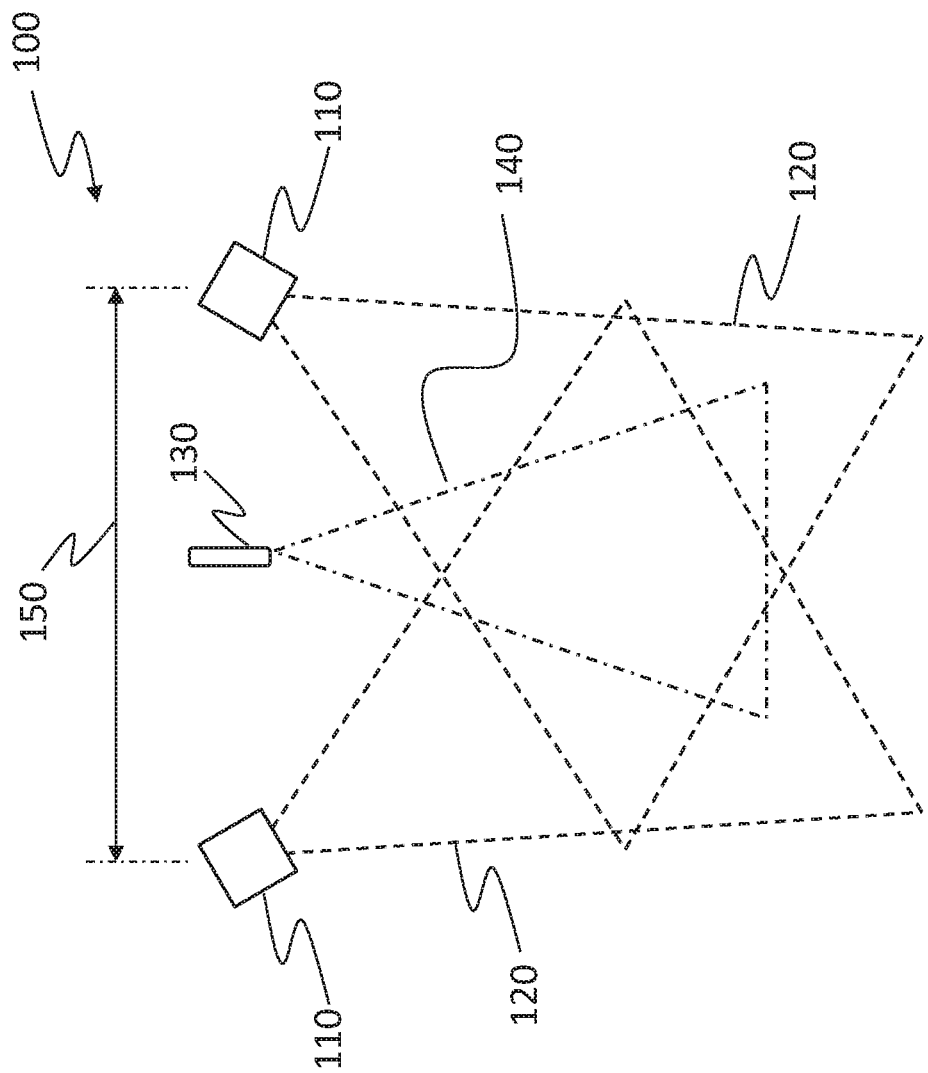

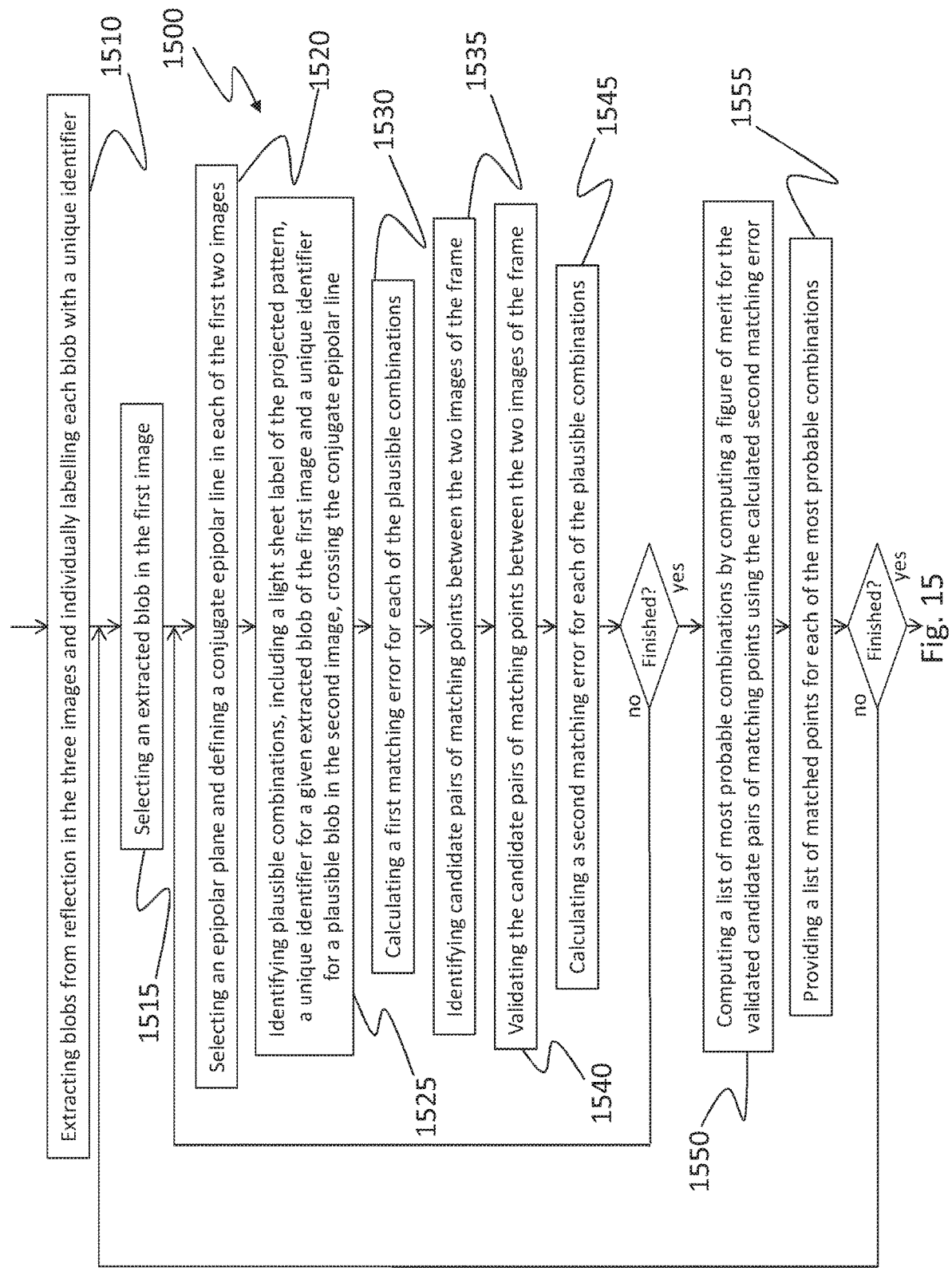

STRUCTURED LIGHT MATCHING OF A SET OF CURVES FROM THREE CAMERAS

CROSS-REFERENCE TO RELATED APPLICATION

The present application is a continuation-in-part of U.S. patent application Ser. No. 15/114,563, filed on Jul. 27, 2016, now U.S. Pat. No. 10,271,039, issued on Apr. 23, 2019, which is a United States national phase of PCT International Patent Application No. PCT/IB2015/050856, filed on Feb. 4, 2015, which claims the benefit of U.S. Provisional Patent Application No. 61/936,033, filed on Feb. 5, 2014.

TECHNICAL FIELD OF THE INVENTION

The present invention generally relates to the field of three-dimensional scanning of the surface geometry of an object, and, more particularly, to structured light stereovision.

BACKGROUND OF THE INVENTION

Three-dimensional scanning and digitization of the surface geometry of objects is commonly used in many industries and services, and their applications are numerous. A few examples of such applications are inspection and measurement of shape conformity in industrial production systems, reverse engineering of existing parts with complex geometry, biometry, etc.

The shape of an object is scanned and digitized using a ranging sensor that measures the distance between the sensor and a set of points on the surface. Different principles have been developed for range sensors. Among them, triangulation-based range sensors are generally adequate for close range measurements, such as distances inferior to a few meters. Using this type of apparatus, at least two rays that converge to the same feature point on the object are obtained from two different viewpoints separated by a baseline distance. From the baseline and two ray directions, the relative position of the observed point can be recovered. The intersection of both rays is determined using the knowledge of one side length and two angles in the triangle, which actually is the principle of triangulation in stereovision. The challenge in stereovision is to efficiently identify which pixels correspond to each other in each image of the stereo pair composing a frame. This problem is especially important for portable or hand-held scanners where, in the most general case, it is imposed that all necessary information for matching is to be found within a single frame.

To simplify the matching problem, one can replace one of the light detectors with a light projector that outputs a set of rays in known directions. In this case, it is possible to exploit the orientation of the projected rays and each detected ray reflected on the object surface to find the matching point. It is then possible to calculate the coordinates of each observed feature point relative to the basis of the triangle.

Although specialized light detectors can be used, digital CCD or CMOS cameras are typically used.

For the projector, the light source can be a coherent source (laser) or non-coherent source (e.g., white light) projecting a spot, a light plane or many other possible patterns. Although the use of a light projector facilitates the detection of reflected points everywhere on the object surface, the more complex the pattern will be, the greater the challenge will be to efficiently identify corresponding pixels and rays.

For this reason, one will further exploit properties from the theory of projective geometry. It has been well known in the field for at least 30 years in the case of two views that one may exploit epipolar constraints to limit the search of corresponding pixels to a single straight line, as opposed to the search in the entire image. This principle is widely exploited both in passive and active (with a projector) stereovision. One example of this usage is described in U.S. Pat. No. 8,032,327 wherein a laser projector projects two perpendicular light planes as a crosshair pattern whose reflection on the surface is captured by two cameras. Projecting thin monochromatic stripes is advantageous for obtaining good signal-to-noise ratio and simplifying image processing to obtain 3D points from each single frame. Having a single stripe observable by each camera insures that each epipolar line intersects the stripe once thus avoiding matching ambiguities.

To reduce the time that is necessary to capture the shape of the surface of an object, one will need either to increase the frame rate or increase the number of stripes that are projected simultaneously, or both. One approach that was proposed consists in projecting a grid of stripes. Projecting a grid is further interesting for surface reconstruction since the projected pattern produces a network of curves on the object surface where tangent curves from two directions make it possible to measure the surface normal. Surface normal information can be advantageously exploited in real-time surface reconstruction from 3D measurements as described in U.S. Pat. No. 7,487,063. Increasing the number of stripes is advantageous for scanning speed but as the number of stripes is increased, the complexity of matching image points before applying triangulation grows exponentially and introduces ambiguities that, in some cases, cannot be resolved.

One way to solve ambiguities consists in adding one or more cameras but the hardware complexity increases and that will reduce the frame rate limit for a given bandwidth. Methods exploiting one or two cameras have been proposed to match points from a projected grid. The intersection of the reflected curves makes it possible to segment and identify connected networks of curve sections to set additional matching constraints. However, points that are extracted near the intersection of two curves are less precise. "Near" means within a distance where image processing operators on pixels from the two curves, interfere. To maintain precision, one will need to discard and thus lose these points.

It would be helpful to alternately produce two sets of non crossing curves to benefit from the surface normal orientation extracted from the surface tangents while avoiding the projection of a grid in a single frame. However, the matching challenge would remain. One solution would consist in projecting multicolored stripes. However, the color reflectivity on some materials would harm the quality of matching and the projector would need to be more complex. Another approach imposes to position an object on a planar background that must be visible in each frame. This clearly limits the flexibility of the system, especially when it is required to measure objects on site without interfering with the environment.

A need remains for a solution which solves the matching problem independently for each single frame, with only two cameras, a projected pattern which may change and no particular constraint on the observed scene.

SUMMARY OF THE INVENTION

According to a broad aspect, there is disclosed a computer-implemented method performed by at least one computer processor for matching points between three images of a scene, the method including retrieving three images acquired by a sensor, said sensor comprising at least a first camera, a second camera, a third camera and a light projector unit, two images comprising a first image and a second image of the three images being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera and the light projector unit are calibrated in a common coordinate system; extracting blobs from said reflection in said two images and individually labeling said blobs with a unique identifier; for each given extracted blob of the first image: selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob; identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line; calculating a matching error for each of the plausible combinations, wherein the matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light; repeating said steps of selecting, identifying and calculating for each epipolar plane of said set of epipolar planes; determining a most probable combination by computing a figure of merit for said plausible combinations using said matching error for each epipolar plane of said set of epipolar planes; identifying matching points between the two images in said frame using said determined most probable combination and the set of epipolar planes; validating the matching points between the two images in said frame, said validating comprising: for each pair of matching points located on a given epipolar plane, determining a projection of the pair of matching points in the third image of the third camera, determining if the projection of the pair of matching points in the third image of the third camera is located on a blob, identifying the pair of matching points as validated if the projection of the pair of matching points in the third image of the third camera is located on the blob and providing the validated pairs of matching points.

In accordance with an embodiment, the determining of a projection of the pair of matching points comprises computing 3D coordinates of the pair of matching points and determining a corresponding projected position in the third image of the third camera.

In accordance with an embodiment, the determining of a projection of the pair of matching points is performed by determining an intersection between a first given epipolar line and a second given epipolar line and the first given epipolar line is defined using an epipolar plane defined by the center of projection of the first camera, the center of projection of the third camera and the matching point in the first image; and the second given epipolar line is defined using an epipolar plane defined by the center of projection of the second camera, the center of projection of the third camera and the matching point in the second image.

In accordance with a broad aspect, there is disclosed a computer-implemented method performed by at least one computer processor for matching points between three images of a scene, the method including retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system; extracting blobs from said reflection in said two images and individually labeling said blobs with a unique identifier; for each given extracted blob of the first image: selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob; identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line; calculating a matching error for each of the plausible combinations, wherein the matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light; identifying pairs of matching points between the two images in said frame using the calculated matching error for each of the plausible combination; validating the pairs of matching points between the two images in said frame, said validating comprising: for each pair of matching points located on the selected epipolar plane, determining a projection of the pair of matching points in the third image of the third camera, determining if the projection of the pair of matching points in the third image of the third camera is located on a blob, identifying the pair of matching points as validated if the projection of the pair of matching points in the third image of the third camera is located on the blob; repeating said steps of selecting, identifying, calculating, identifying and validating for each epipolar plane of said set of epipolar planes; computing a most probable combination for the given extracted blob of the first image by computing a figure of merit for the validated pairs of matching points; providing corresponding validated matching points using the computed most probable combination.

According to a broad aspect, there is disclosed a computer-implemented method performed by at least one computer processor for matching points between three images of a scene, the method including: retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system; extracting blobs from said reflection in said two images and individually labeling said blobs with a unique identifier; for each given extracted blob of the first image: selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob; identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line; calculating a first matching error for each of the plausible combinations, wherein the first matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light; identifying pairs of matching points between the two images in said frame using the calculated first matching error for each of the plausible combination; validating the pairs of matching points between the two images in said frame, said validating comprising: for each pair of matching points located on the selected epipolar plane, determining a projection of the pair of matching points in the third image of the third camera, determining if the projection of the pair of matching points in the third image of the third camera is located on a blob, identifying the pair of matching points as validated if the projection of the pair of matching points in the third image of the third camera is located on the blob; calculating a second matching error for each of the plausible combinations, wherein the second matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from the center of projection of the third camera and reaches an intersection between the selected epipolar plane and a corresponding sheet of light of the at least one sheet of light; repeating said steps of selecting, identifying, calculating, identifying and validating for each epipolar plane of said set of epipolar planes; computing a most probable combination by computing a figure of merit for the validated pairs of matching points using the calculated second matching error and providing corresponding validated matching points using the computed most probable combination.

According to a broad aspect, there is disclosed a computer-implemented method performed by at least one computer processor for matching points between three images of a scene, the method including: retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system; extracting blobs from said reflection in said two images and individually labeling said blobs with a unique identifier; for each given extracted blob of the first image: selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob; identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line; calculating a first matching error for each of the plausible combinations, wherein the first matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light; identifying pairs of matching points between the two images in said frame using the calculated first matching error for each of the plausible combination; validating the pairs of matching points between the two images in said frame, said validating comprising for each pair of matching points located on the selected epipolar plane, determining a projection of the pair of matching points in the third image of the third camera, determining if the projection of the pair of matching points in the third image of the third camera is located on a blob, identifying the pair of matching points as validated if the projection of the pair of matching points in the third image of the third camera is located on the blob; calculating a second matching error for each of the plausible combinations, wherein the second matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from the center of projection of the third camera and reaches an intersection between the selected epipolar plane and a corresponding sheet of light of the at least one sheet of light; repeating said steps of selecting, identifying, calculating, identifying and validating for each epipolar plane of said set of epipolar planes; computing a list of most probable combinations by computing a figure of merit for the validated pairs of matching points using the calculated second matching error and providing the list of the most probable combinations.

BRIEF DESCRIPTION OF THE DRAWINGS

The above-mentioned features and objects of the present disclosure will become more apparent with reference to the following description taken in conjunction with the accompanying drawings, wherein like reference numerals denote like elements and in which:

FIG. 1 includes FIG. 1A and FIG. 1B, wherein FIG. 1A is an illustration of an example system configuration with a light projector unit and FIG. 1B is an illustration of an example system configuration with a light projector unit which includes two light projectors;

FIG. 5 includes FIG. 5A, FIG. 5B, and FIG. 5C, wherein

FIG. 7 includes FIG. 7A and FIG. 7B, wherein

FIG. 15 is a flowchart of a computer-implemented method for matching points between three images before providing the most probable lists of matched points;

DETAILED DESCRIPTION OF THE INVENTION

In order to efficiently find matches in every frame using two cameras, a system and computer-implemented method are proposed.

Figure 1B:
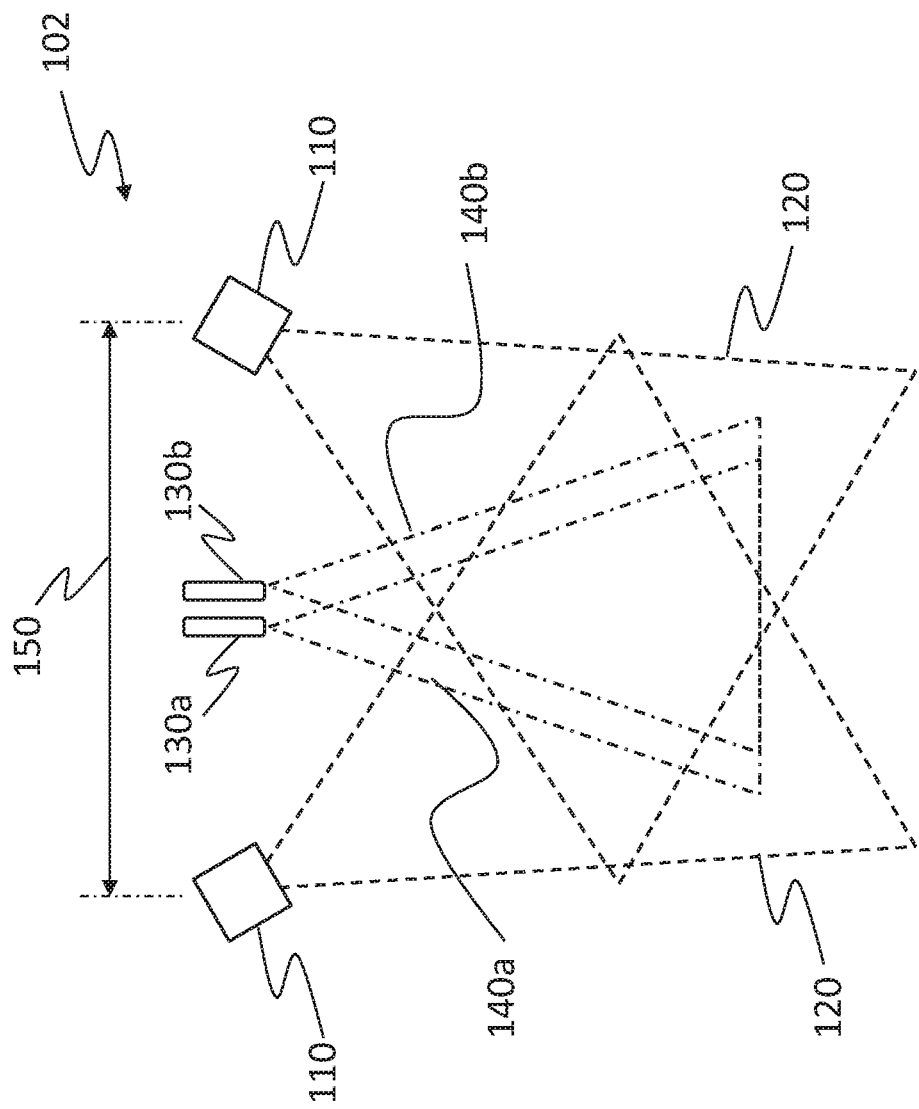

FIG. 1 illustrates an example embodiment of the sensor 100. One or more light projector units 130 are mounted between the two cameras 110. Each camera 110 has a field of view 120. Each light projector unit 130 projects a pattern within a respective span 140, labelled 140a and 140b. In FIG. 1A, the light projector unit 130 includes a single light projector. In FIG. 1B, the sensor 102 has a different embodiment for the light projector unit which includes two light projectors 130a, 130b. The light projectors could be laser light projectors, white light projectors etc.

Figure 2:
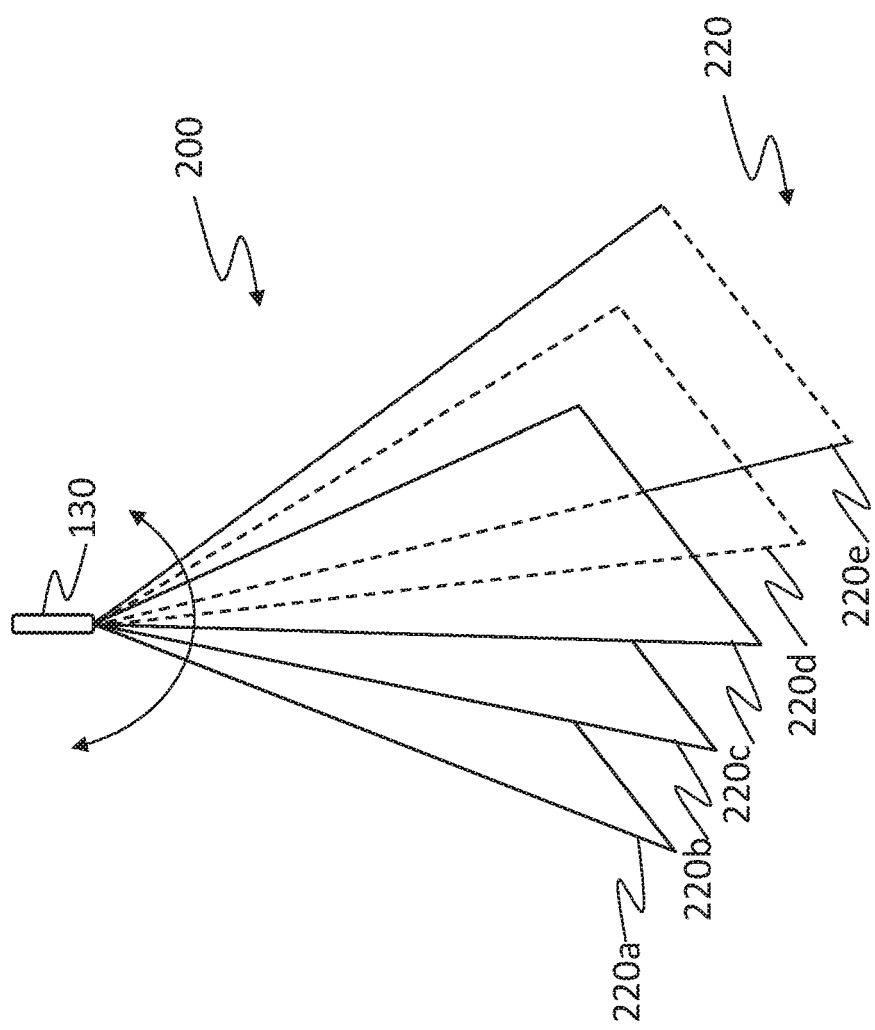
FIG. 2 is an illustration of a light projector unit projecting a set of light planes.

In one example embodiment, the baseline 150 between the cameras 110 is 170 mm and the focal length of the lens of the cameras is 5.7 mm. The vergence of the optical axes of the two cameras is about 30°. For the light projector unit 130 shown in FIG. 2, the number of light planes is 5 but can vary, for example between 1 and 15 or even more. An example embodiment 200 of a light projector unit 130 that produces 5 light planes 220, labelled 220a, 220b, 220c, 220d and 220e, is illustrated in FIG. 2.

Figure 3:
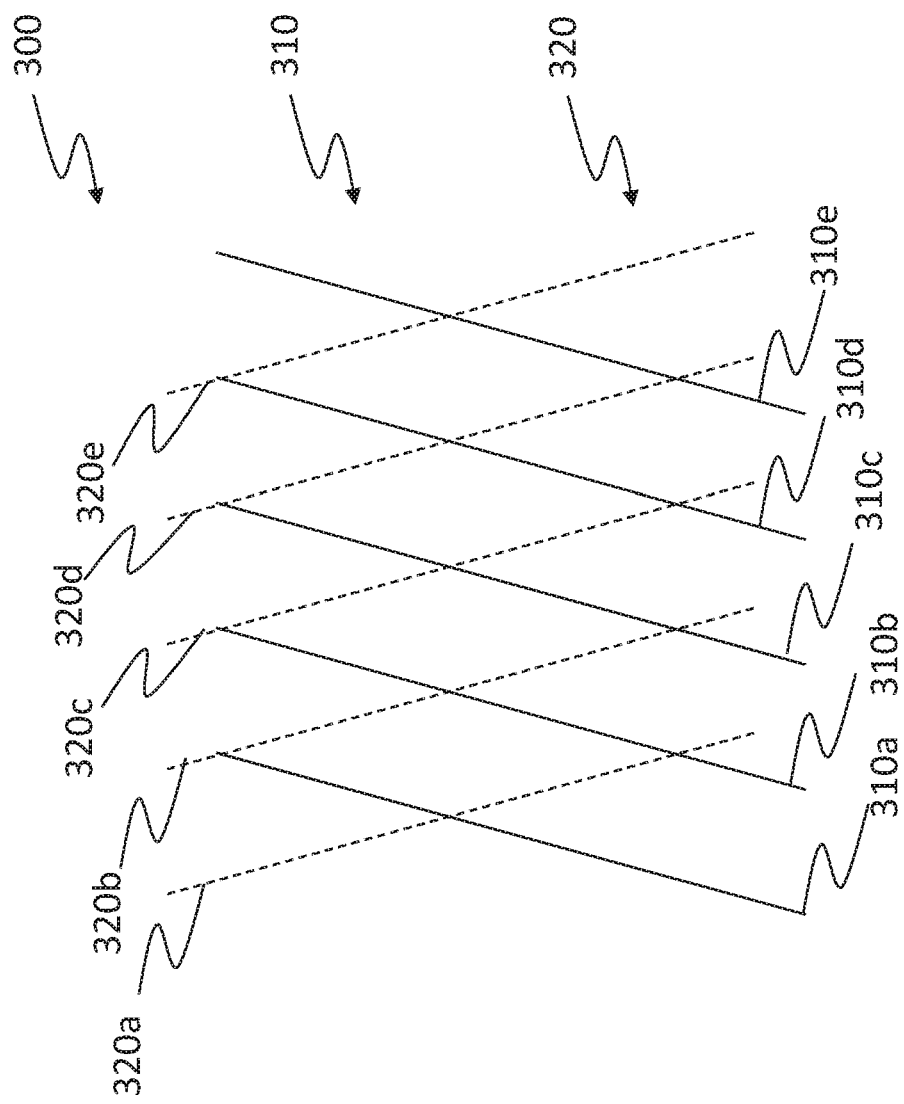
FIG. 3 is an illustration of two combined patterns reflected from a planar surface.

In the embodiment of FIG. 1B, the two light projectors 130a, 130b are oriented so as to produce different patterns creating intersecting curves 300 on the surface as shown in FIG. 3. The system will alternately project each pattern. Two sets of curves 310 and 320 are projected by projectors 130a, 130b respectively. They are labelled 310a, 310b, 310c, 310d and 310e and 320a, 320b, 320c, 320d and 320e. For example, in the example embodiment of FIG. 1B, the light projectors 130a and 130b are themselves oriented at an angle to the object, for example +30° and −30°, to produce the different patterns.

As will be readily understood, a projection unit 130 could include a programmable light projector unit which could project more than one pattern of light. For example, a projection unit 130 could be programmed to project the two sets of intersecting curves 300 and an additional light plane simultaneously or alternatively.

The cameras 110 and the light projector unit 130 are calibrated in a common coordinate system. This means that intrinsic parameters, including distortion parameters, as well as extrinsic parameters for both cameras 110 are measured. Each of the sheets of light that are projected, are calibrated in the same coordinate system. In this example, the sheets of light are planar approximations. It is also possible to affix bandpass filters on the camera lenses to match the wavelength of the projector. This will reduce interferences from ambient light and other sources.

Using such a sensor 100 with at least one computer processor, 3D points can be obtained after applying the following computer-implemented method. Two images of a frame are captured using two cameras 110. The two images are captured simultaneously, meaning that there is no relative displacement between the scene and the sensor 100 during the acquisition of the images or that this relative displacement is negligible. The cameras are synchronized to either capture the images at the same time or sequentially during an extended period of time in which the relative position of the sensor 100 with respect to the scene remains the same or varies within a predetermined negligible range. Both of these cases are considered to be a simultaneous capture of the images by the sensor.

Once the two images of a frame have been captured, image processing is applied. The two images contain the reflection of the projected pattern in the scene, from the two respective viewpoints of the cameras 110. The reflected pattern appears as a set of curve sections in each image. These curve sections appear lighter than the background in the images and can be segmented using state of the art techniques. One technique consists in thresholding the image signal. Segmentation validation can be applied since the profile of a curve is typical; it appears in an image as a crest profile. The width can also be validated. To reduce an impact of noise, the length of a curve segment will also exceed a minimum threshold that is set to a predetermined number of pixels, such as 2 pixels, for example. The pixels that are part of the same connected component define a blob that is indexed with a label. The position of the center of the profile section is finally estimated for each pixel line along the blob before joining these centers to compose a polyline.

Figure 4:
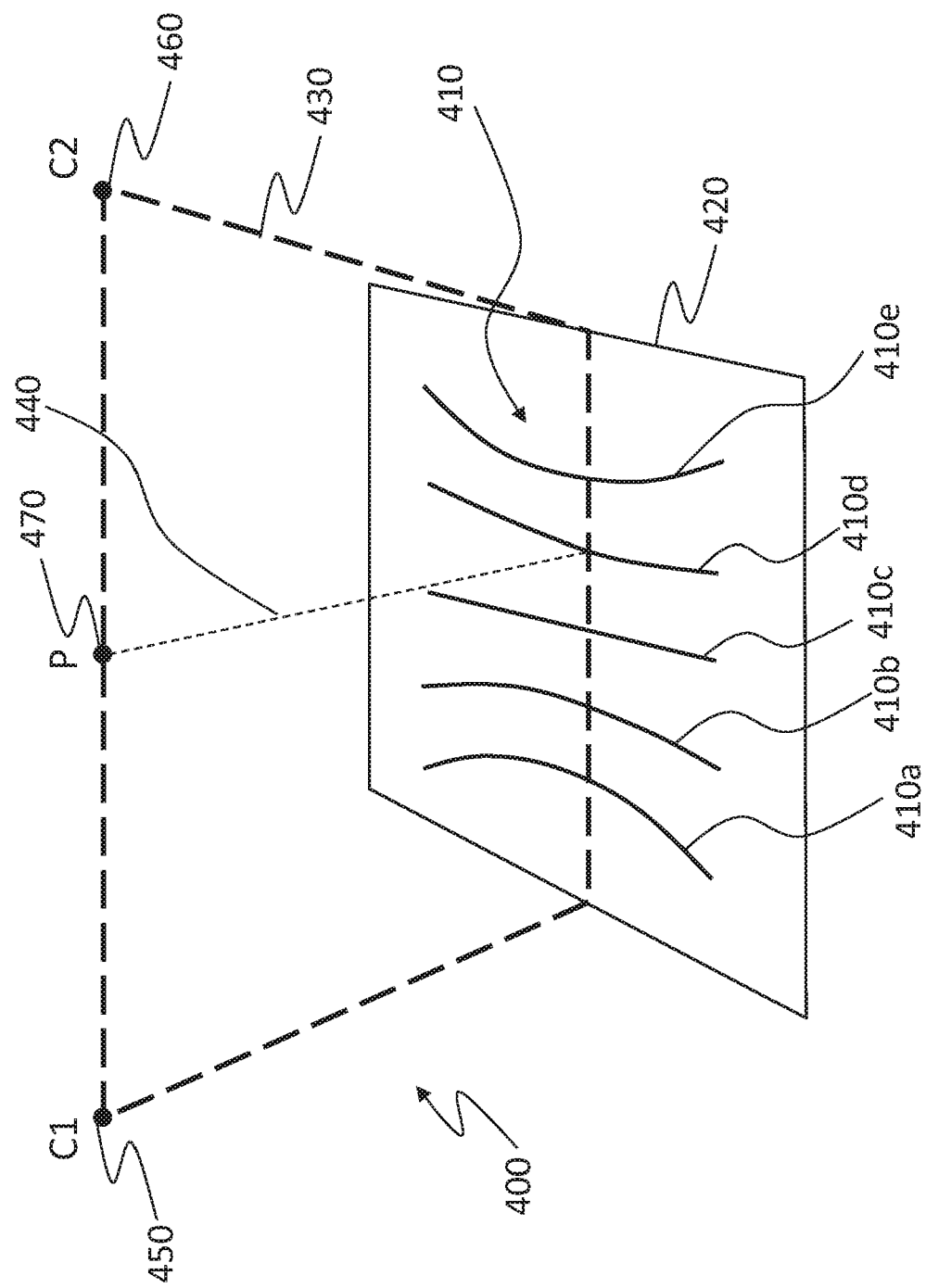
FIG. 4 is a representation of an epipolar plane overlaid on a scene.

Once the two images of a frame have been segmented, an epipolar plane is selected. An example epipolar plane 430 is shown in FIG. 4 which is an illustration 400 of an epipolar plane 430 overlaid on a scene 420. The epipolar planes share a common line segment between the center of projection 450 and 460 of the two cameras C1 and C2. The line segment C1-C2 acts as a rotational axis for defining the epipolar planes. Thus, the set of epipolar planes can be indexed using a parameter angle or, equivalently, a pixel coordinate in an image. An epipolar plane intersects the two image planes and thus defines two conjugate epipolar lines. Without loss of generality, assuming a rectified stereo pair of images, each image line is an index of an epipolar plane. In the case illustrated in FIG. 4, the scene 420 is planar. A ray 440 arising from the center of projection 470 of Projector P is shown in dotted line. The curve profiles 410 reflected from the scene 420 are apparent. They are labelled 410a, 410b, 410c, 410d and 410e.

Figure 5A:
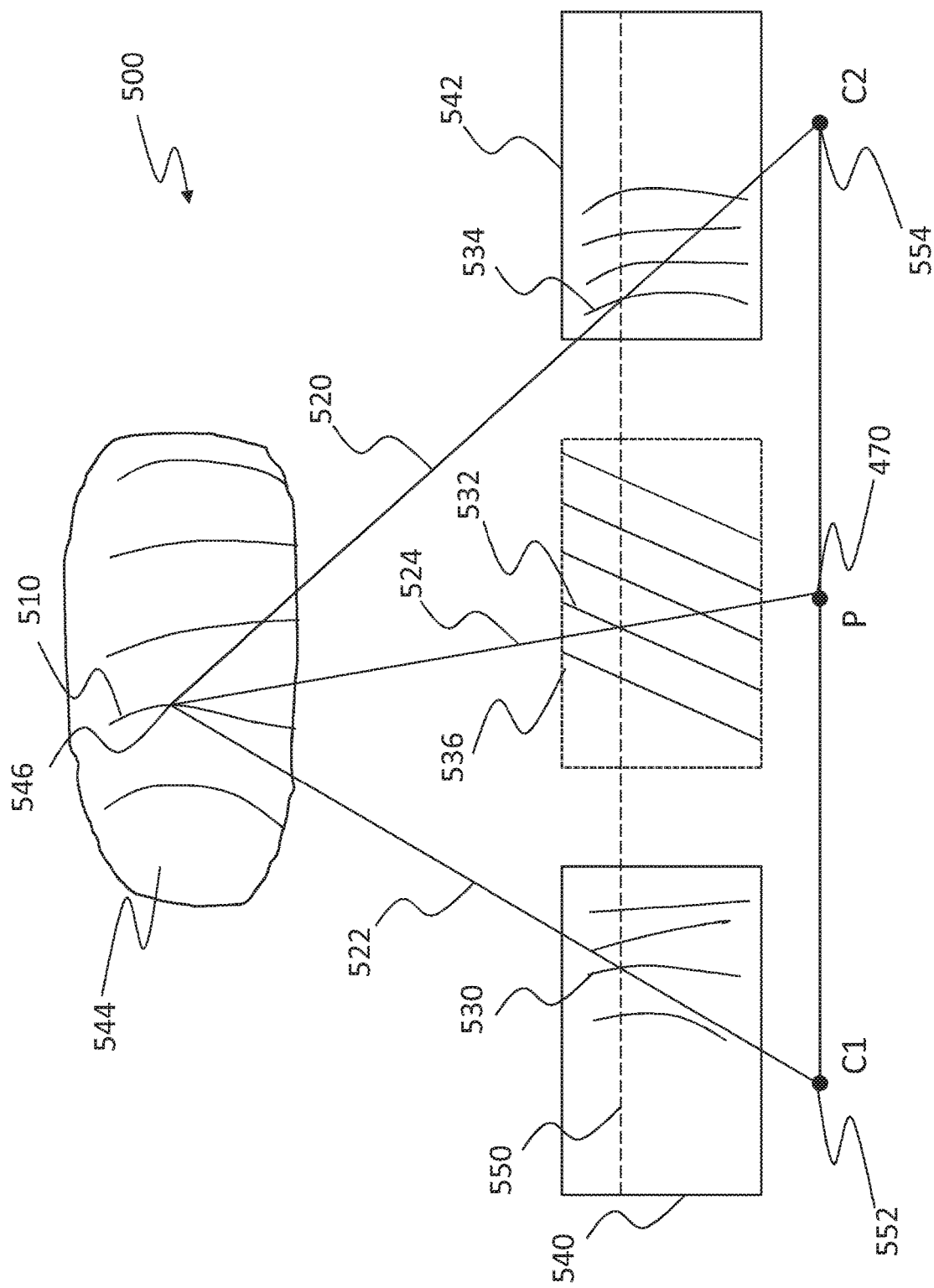
FIG. 5A depicts a view of two images, a projected pattern and its reflection on an object.

FIG. 5A depicts a view 500 of the images, a projected pattern and its reflection on an object 544. For each epipolar plane 550 or equivalently, in the figure, for each line of pixels in the images, the segmented blobs crossing the current line in both images 540 and 542, are identified to generate a list of blob indices for each image. The first camera C1 is represented by its center of projection 552 and its image plane 540. The second camera C2 is represented by its center of projection 554 and its image plane 542. The projector P is illustrated by a center of projection 470 and an image plane 536. It is not necessary that the center of projection 470 of the projector be located on the baseline between the centers of projection 552, 554 of the cameras although it is the case in the example embodiment of FIG. 5A.

The intersection 550 between the image planes and the epipolar plane is shown using a dotted line. Rays 522, 520 and 524 belong to the same epipolar plane. The projector projects at least one light plane 532 onto the object 544, thus producing a reflected curve 510. This reflected curve 510 is then imaged in the first image captured by the first camera C1 (imaged curve 530) while it is also imaged in the second image captured by the second camera C2 (imaged curve 534). Point 546 on reflected curve 510 is then present on imaged curves 530, 534 and should be properly identified and matched in these images to allow finding its 3D coordinates. The imaged curves 530, 534 intersect the illustrated epipolar plane on intersection 550 along rays 522 and 520, originating from the reflected curve 510 on the object 544.

Figure 6:
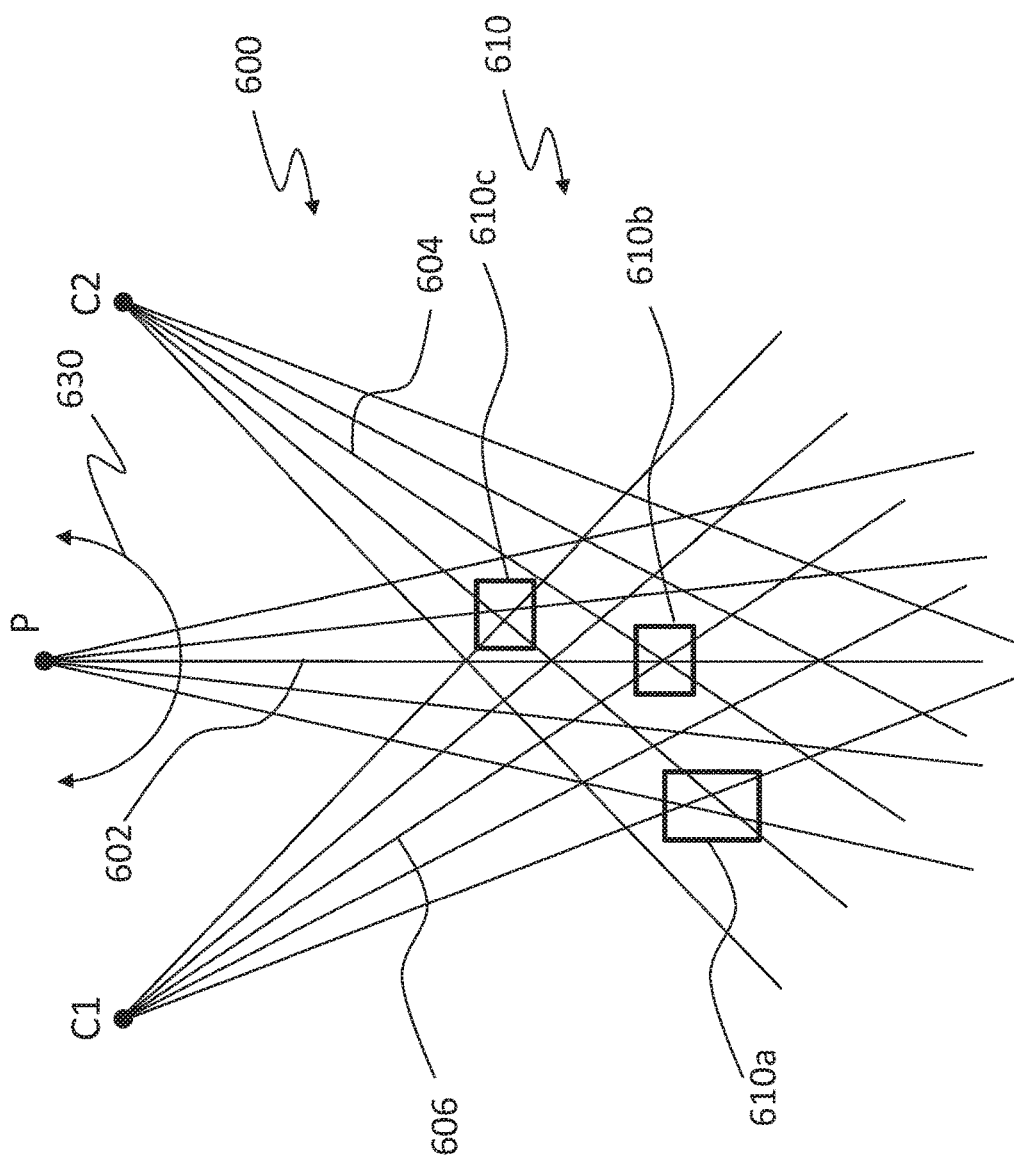
FIG. 6 is a representation of ray crossings from the two cameras and light projector unit.

Since the light projector unit and the cameras are calibrated in the same coordinate system, it is possible to index triplets of indices where a triplet (I1, I2, IP) is composed of the index of the curve in the first image I1, the index of a candidate corresponding curve in the second image I2 and the index of the light sheet in the projector IP. The number of possible combinations is $O(N^3)$ which is the order of growth of the number of combinations as N, the number of light sheets in the projected pattern, grows. In order to limit the number of combinations, one may analyze the intersections 610 of the line rays within the epipolar plane and attribute an error measure to a given intersection. FIG. 6 is a representation 600 of ray crossings from the two cameras and the projector. Rays 604 and 606 are captured by cameras C2 and C1 respectively. Ray 602 is projected by the projector P. For the projector P, the rays can be indexed using an angle 630. Some intersections 610 are a more probable match, such as intersection 610b which appears to cross in a single point while other intersections, such as intersections 610a and 610c have a greater error.

Figure 7B:
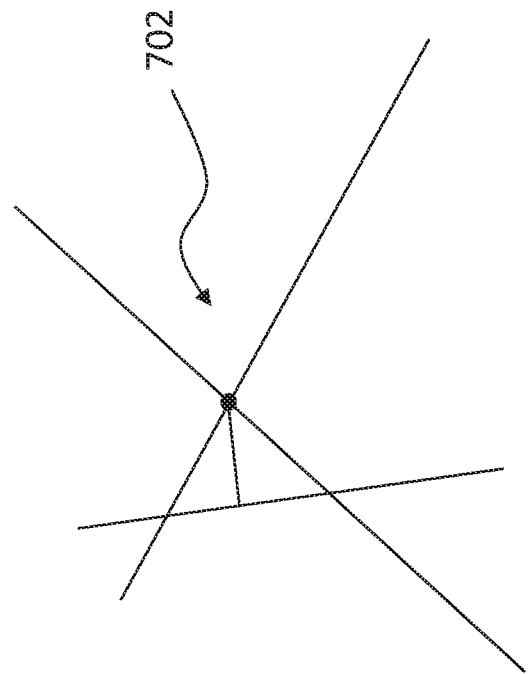
FIG. 7B depicts another way of measuring the quality of a match.
Figure 7A:
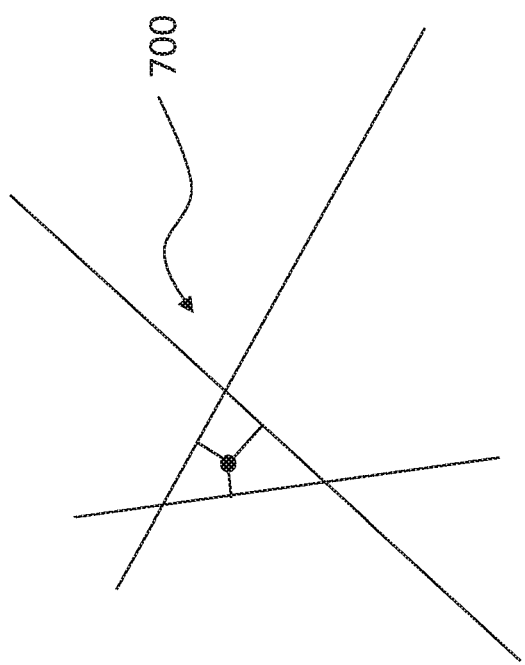
FIG. 7A depicts one way of measuring the quality of a match.

FIGS. 7A and 7B illustrate two example error measurements that can be attributed to an intersection. In FIG. 7A, the error measure 700 is the minimal sum of distances between a point and each of the three rays. In FIG. 7B, the error measure 702 is the distance between the intersection of the two camera rays and the projector ray. Other variants are possible. The number of plausible combinations can be reduced significantly after imposing a threshold to the obtained values. When the sheets of light of the projector can be approximated by planes that are indexed by an angle, the second error measure can be computed efficiently while allowing one to keep only the closest plane. This will reduce the matching complexity to $O(N^2)$.

After completing these operations, one obtains a list of triplets of potential matches where each is attributed an error and the index of the epipolar plane. This operation is repeated for all epipolar planes crossing blob segments, typically (although not necessarily) for all rows of pixels in the rectified images.

Figure 8:
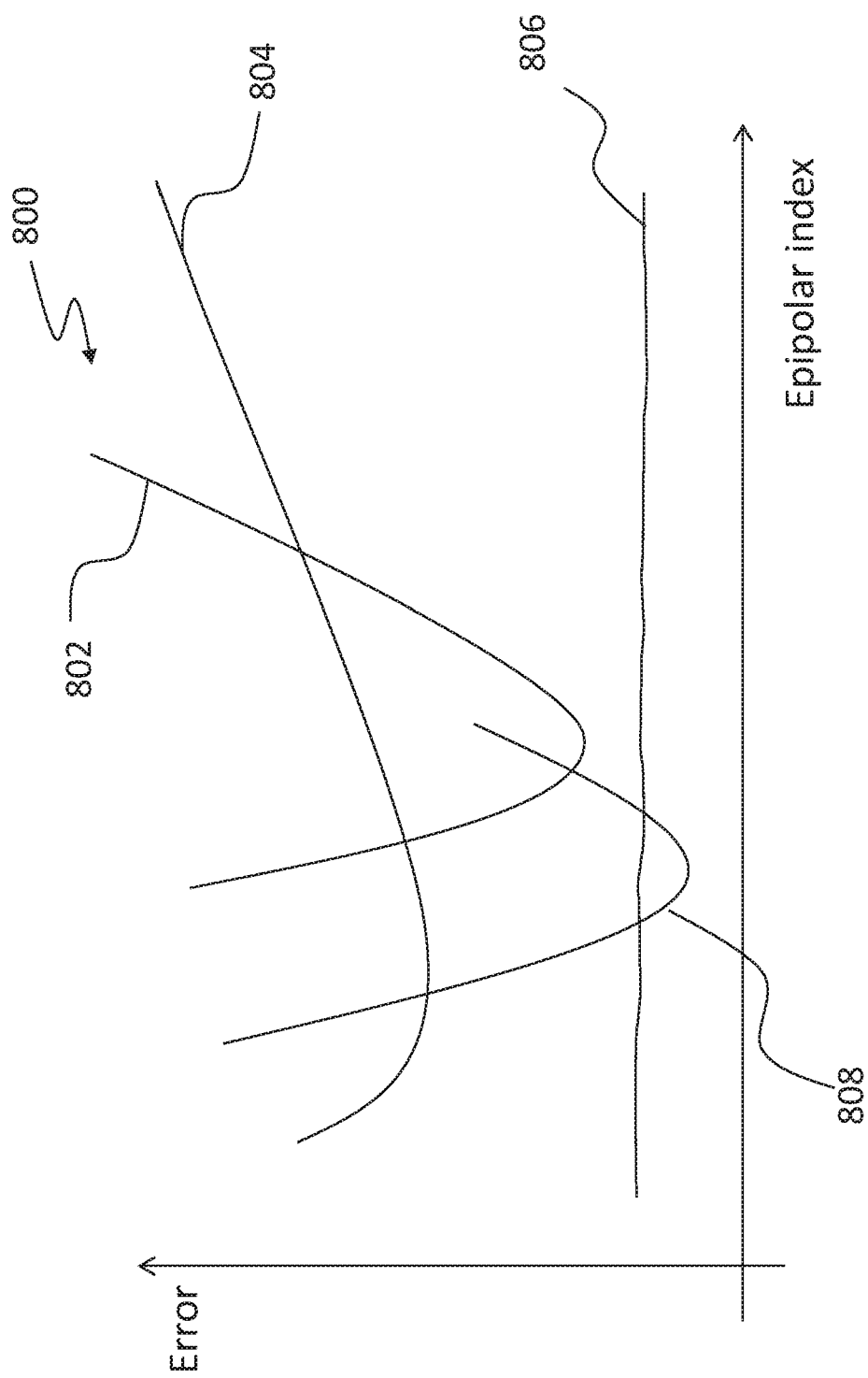
FIG. 8 depicts a graph of the matching error for a set of blobs.

The triplets along with their associated error and epipolar index are then tracked against the epipolar index. In FIG. 8, a graph 800 of the errors with respect to the epipolar index is depicted for each of four triplets with curves 802, 804, 806 and 808. Graph 800 combines the information for all plausible triplets. More importantly it integrates, for a given triplet, all the information for a blob along the epipolar planes. Thus, for example, after calculating the average error for a given curve, one will obtain a figure of merit for matching the corresponding triplet. In FIG. 8, the triplet whose error is depicted at curve 806 would produce the best figure of merit in this example. The average error can be further validated after applying a threshold. One can also further validate by making sure there is no ambiguity. Actually, for short curve sections, it is possible that more than one triplet will present a low average error. In this case, the match would be rejected. It is worth noting that a curve may locally reach a lower minimum than the curve with the best figure of merit such as is the case with curve 808. This will happen, for instance, when the projected light sheet is not perfectly calibrated or when there is higher error in peak detection of the curves in the images. FIG. 8 further shows that the identified curves are not necessarily of the same length. That will depend on the visibility of the reflected curved in both images.

After completion of the matching step for a given frame, 3D points are calculated from the observations for each triplet. For that purpose, one may minimise the distance between the 3D point and each of the three rays in space. It is then assumed that the projected light sheets are very well calibrated, either parametrically or using a look-up table (LUT) to eventually obtain more accurate measurements. In practical applications, the projected light sheet produced through commercial optic components may not correspond exactly to a plane. For this reason, the use of a LUT may be more appropriate. Another possible approach consists in only exploiting the images from the two cameras for the final calculation of the 3D points. One may otherwise minimise the reprojection error of a 3D point, in the 2D images. It is then not necessary to accurately calibrate the projected planes. Moreover, in this latter case, the 3D measurement is less affected by the profile of the reflected signal such as a texture discontinuity on the surface of the object. The resulting 3D points are more accurate. After calculating the sets of 3D points, one obtains segments of 3D curves.

Figure 9:
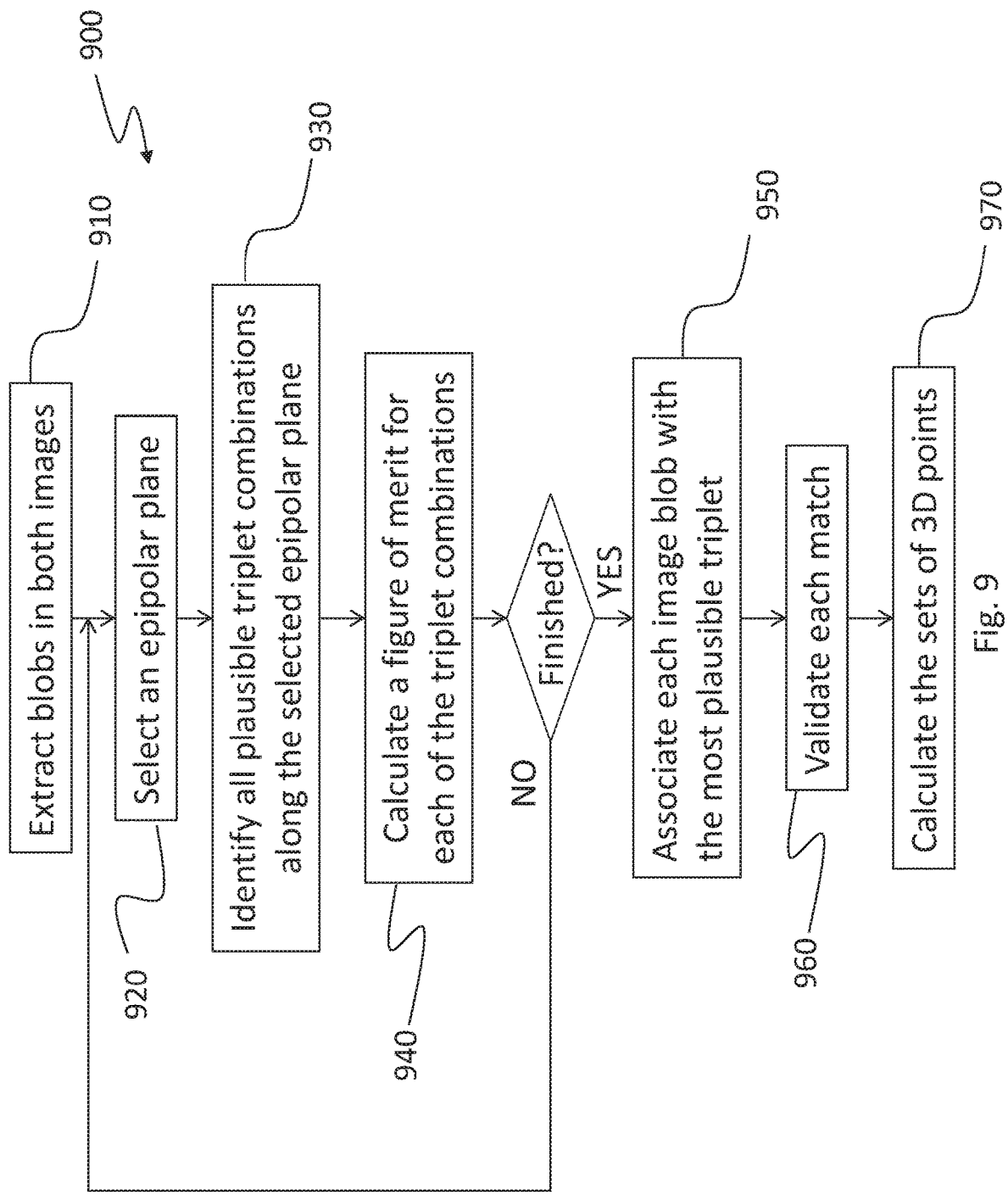
FIG. 9 is a flowchart of an example method for matching and producing 3D points.

Example steps for the matching method 900 are shown in FIG. 9. Blobs are extracted 910 in both images. An epipolar plane is selected 920. All plausible triplet combinations along the selected epipolar plane are identified 930. A figure of merit is calculated 940 for each of the triplet combinations. When all figures of merit are calculated, each image blob is associated 950 with the most plausible triplet. Each match is validated 960. The sets of 3D points are then calculated 970.

The method benefits from the spatial continuity of the blobs that are matched over several epipolar planes as opposed to independent matching along each of the epipolar planes. Nevertheless, it is still possible that some matching errors remain. For instance, a blob may appear as a "Y" shape structure in one image, due to the incidental projection of two curves on a specific geometry. Furthermore, if the number of planes increases, for instance beyond 15, the number of ambiguities may also increase. However, those ambiguities would have to stay persistent from one frame to the other to affect the surface when a surface reconstruction method such as that described in U.S. Pat. No. 7,487,063 takes the 3D points as input. Actually, this type of approach is well adapted for eliminating outlier observations since the surface is reconstructed in areas where multiple observations have been acquired.

When integrated in a mobile 3D sensor system, that is when there is relative motion between the object and the sensor, the system estimates its position at each frame in order to integrate 3D points in a common coordinate system. The system may estimate the position of the sensor at each frame using targets, such as retro-reflective targets, for example, using the geometry or texture of the object when the object is rigid (or "quasi-rigid"). When the system further integrates a camera that captures the texture, the pose of the sensor may also be calculated after matching texture characteristics.

In the example embodiment shown in FIG. 3, two such sets of light sheets produce two sets of curves 310 and 320, in this case parallel lines, when projected on a plane. The system then projects alternating sets of light sheets with different orientations. The 3D curve sections that would be captured on the surface of an object make it possible to estimate local tangent vectors on the surface of the observed object. Moreover, while alternating light sheet sets, local tangent vectors can be calculated along different directions and from these 3D tangent vectors, one will calculate the surface normal orientation on the surface. Surface normal information can help improve 3D surface reconstruction.

Figure 10:
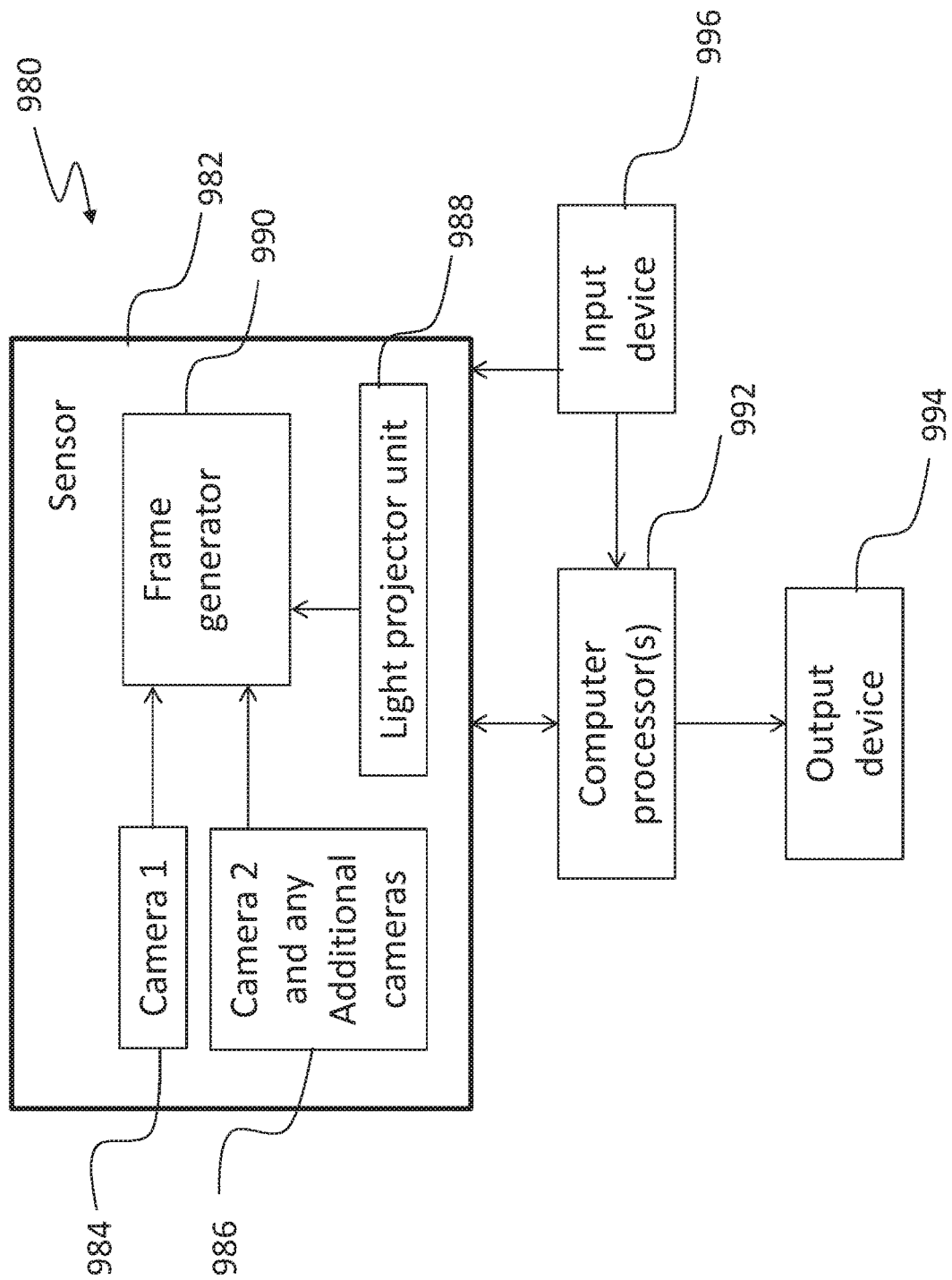
FIG. 10 is a block diagram of example main components of the system for matching and producing 3D points.

FIG. 10 is a block diagram showing example main components of the system 980. The sensor 982 includes a first camera 984 and at least a second camera 986 as well as a light projector unit 988 including at least one light projector. A frame generator 990 may be used to assemble the images captured by the cameras in a single frame. The sensor 982 is in communications with at least one computer processor 992 for implementing the processing steps to match points between the images of the frame. The computer processor(s) 992 is in electronic communications with an output device 994 to output the matched points and/or any additional or intermediary outputs. As will be readily understood, it may be necessary to input data for use by the processor(s) 992 and/or the sensor 982. Input device(s) 996 can therefore be provided for this purpose.

Figure 5B:
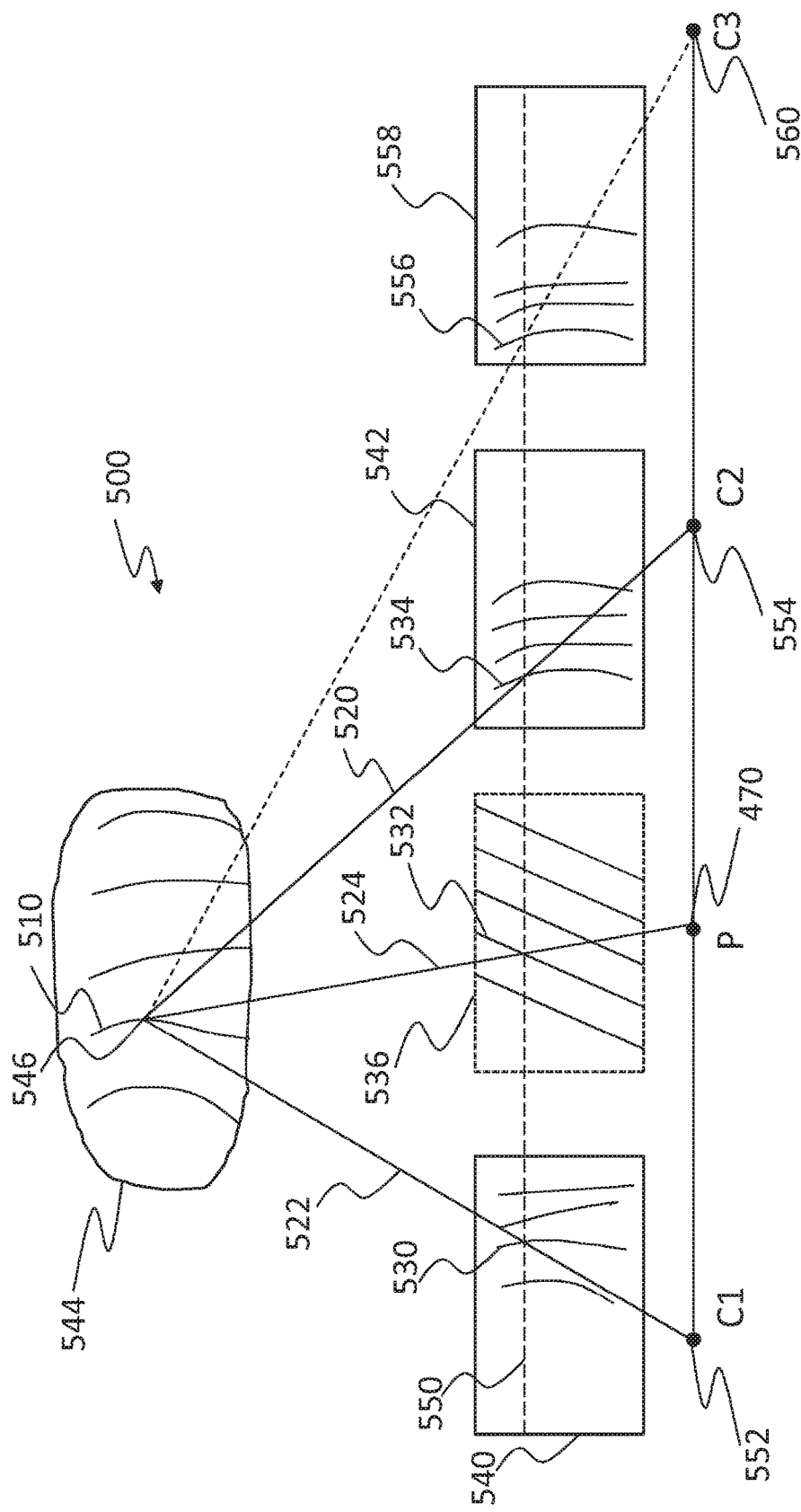
FIG. 5B depicts a view of three aligned images, a projected pattern and its reflection on an object.
Figure 5C:
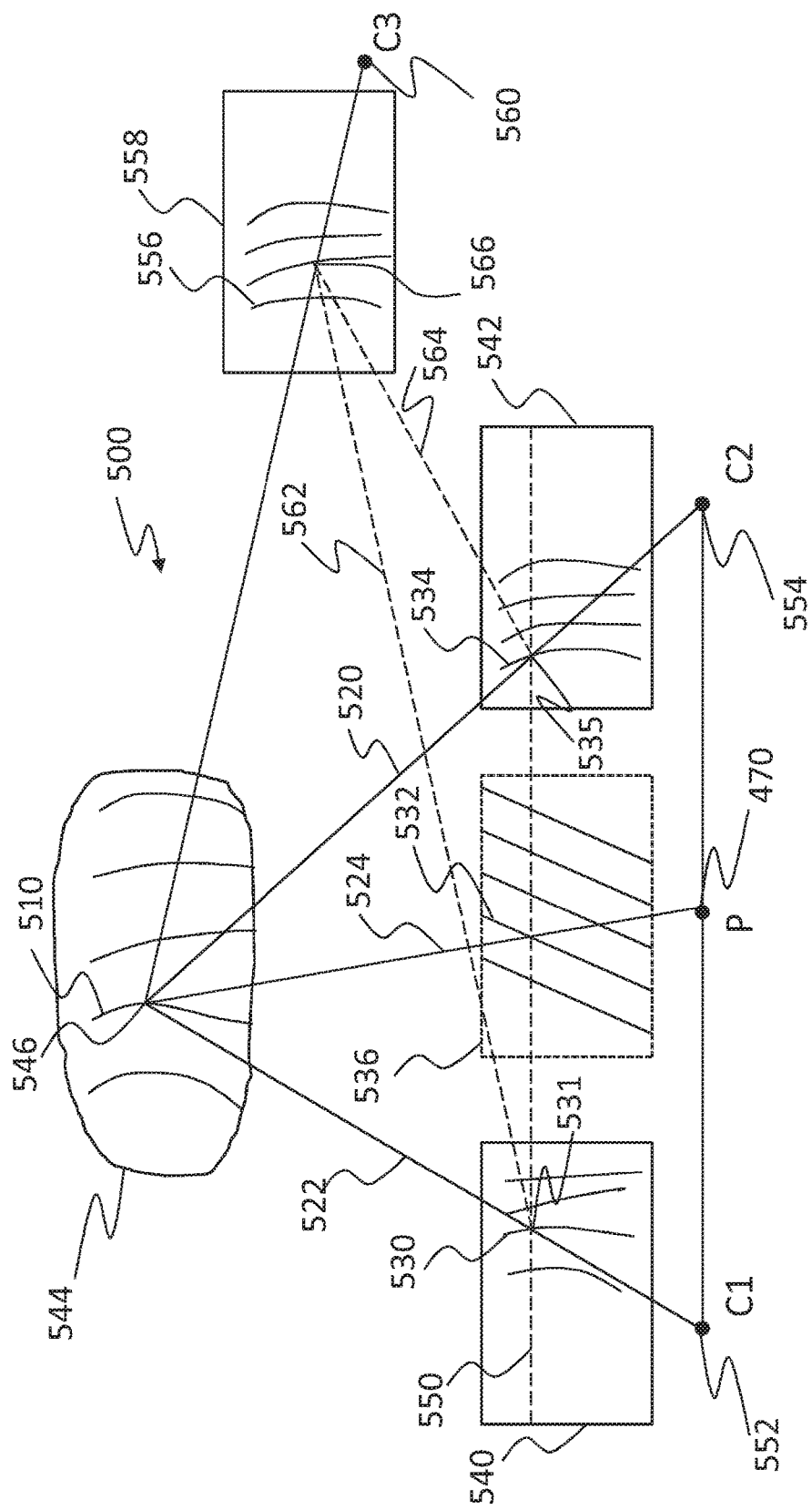
FIG. 5C depicts another configuration with three images.

As will be readily understood, although the method described herein is carried out with two images thereby forming triplet combinations, more than two images could be acquired per frame, at a given time, and the combinations could contain more than three elements. This is illustrated in FIGS. 5B and 5C where three cameras and a projector are represented. While in FIG. 5B, the three cameras are aligned, the more general case is depicted in FIG. 5C where camera C3 is not aligned. In this latter case when the cameras are not aligned but calibrated in a common coordinate system, it is possible to predict the position of an image point 566 in image from camera C3 given the positions of two potential matching points 531 and 535 in images 1 and 2 respectively, without calculating their 3D coordinates. The coordinates can be obtained using the equations of the conjugate epipolar lines 562 and 564, wherein the first given conjugate epipolar line 562 is defined using an epipolar plane defined by the center of projection C1 of the first camera 552, the center of projection C3 of the third camera 560 and the matching point 531 in the first image. The second given conjugate epipolar line 564 is defined using an epipolar plane defined by the center of projection of the second camera, the center of projection of the third camera and the matching point 535 in the second image. The corresponding point should lay at 566 in image 3, that is at the intersection of the two epipolar lines. In the more general case of any camera arrangement, one will obtain the coordinates of point 566 after calculating the 3D coordinates of the point 546 from image points 531 and 535 and thereafter projecting the 3D point into image 3 at 558, using calibration parameters.

Alternatively or additionally to the matching method, if more than two images are acquired per frame, the triplet combinations for two of these images could be used to match the points as described above and the additional image(s) could be used to validate the match. Actually, after determining a projection of the pair of matching points in the third image of the third camera, one will at least verify that the projection of the pair of matching points in the third image of the third camera is located on a blob. This condition does not assure but reinforce the probability of a good match. It is possible that a blob be partially occluded in a camera image.

Figure 11:
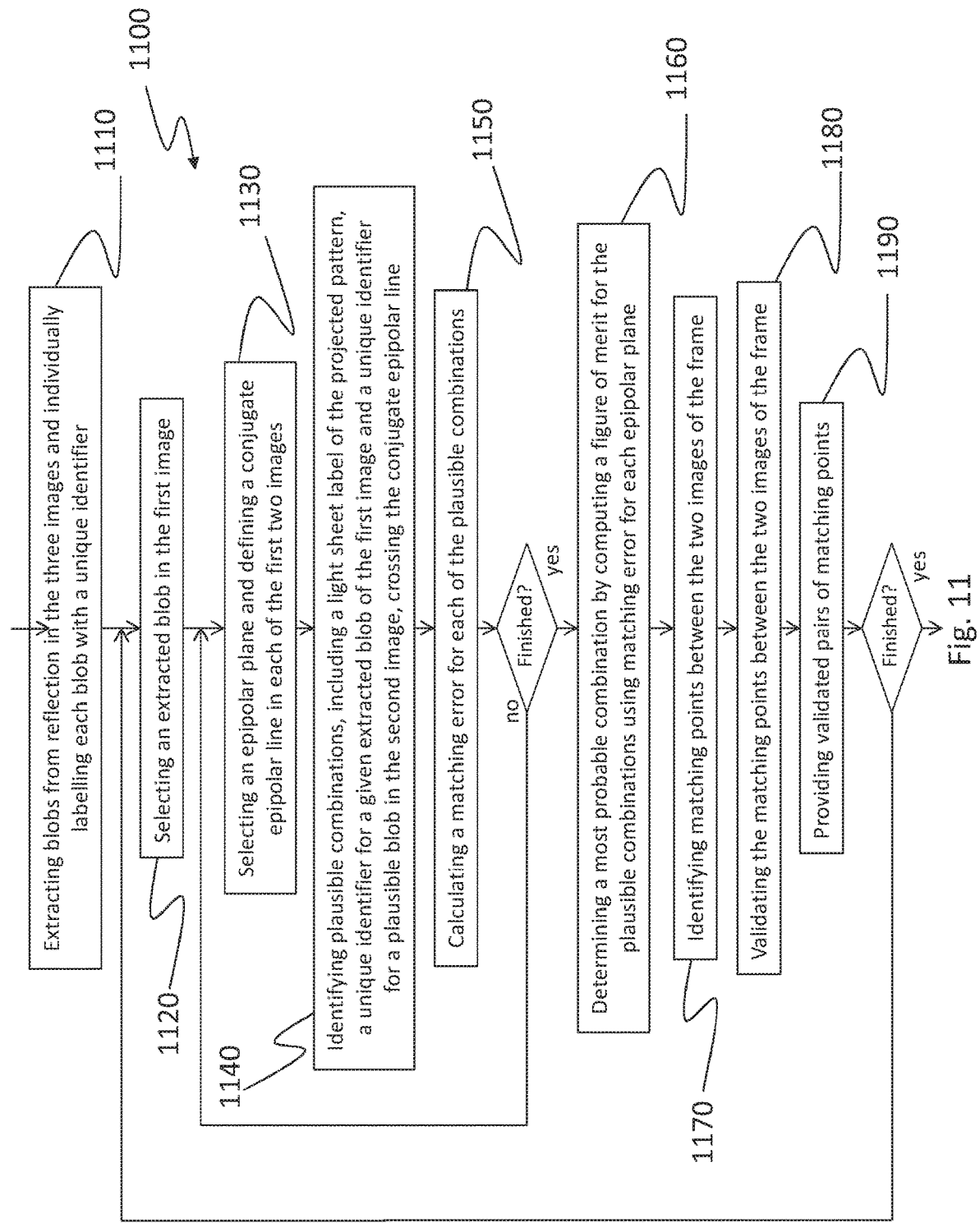
FIG. 11 is a flowchart of a computer-implemented method for matching points between three images of a scene before validating the matching pairs.

FIG. 11 illustrates a flowchart of this method. After retrieving a frame at a single relative position between the scene and the sensor, one extracts, at step 1110, blobs in the three images as described above. Typically, the blobs will be imaged as light curves on a darker background. These blobs originate from the reflection of light sheets projected by the projector onto the scene. They are all labelled with a unique identifier.

Then, for each blob in one of the images, hereafter referred to as the first image at step 1120, an epipolar plane is selected and from this selected epipolar plane, the conjugate epipolar line equations are calculated in each of the first two images at step 1130. The selected epipolar plane is defined by the center of projection of each of the first and the second cameras and an image point located on the given extracted blob.

Then, plausible combinations, including a light sheet label of the projected pattern, a unique identifier for the extracted blob of the first image and a unique identifier for a plausible blob in the second image, are identified at step 1140. A blob is plausible when it crosses the conjugate epipolar line.

At step 1150, a matching error is calculated for each of the plausible combinations. Such a matching error, also described above and in FIG. 7, is indicative of a proximity between intersections of each pair among three rays, wherein a first ray originates from the center of projection of the first camera and reaches the given extracted blobs crossing the conjugate epipolar line in the first camera, a second ray originates from the center of projection of the second camera and reaches the plausible blob crossing the conjugate epipolar line in a second camera image and finally, the third ray originates from the center of projection of the light projector unit and reaches an intersection between the selected epipolar plane and a corresponding sheet of light of the projector. These steps illustrated at 1130, 1140, and 1150 are repeated for each epipolar plane of a set of selected epipolar planes. For instance, and without loss of generality, the set of epipolar planes will include all epipolar planes crossing the extracted blob in the first image where each of the planes intersects the blob at one different line in the first image.

According to step 1160, a most probable combination is determined by computing a figure of merit for the plausible combinations using the matching error calculated for each epipolar plane of the set of epipolar planes as described above and in FIG. 9.

Then at step 1170, the matching points between the two images of the frame are identified for the most probable combination. While the matching obtained for the most probable combination can be validated after applying a threshold to the figure of merit, the third camera image makes it possible to further validate, at step 1180, the match to reduce the number of remaining potential ambiguities.

Figure 12:
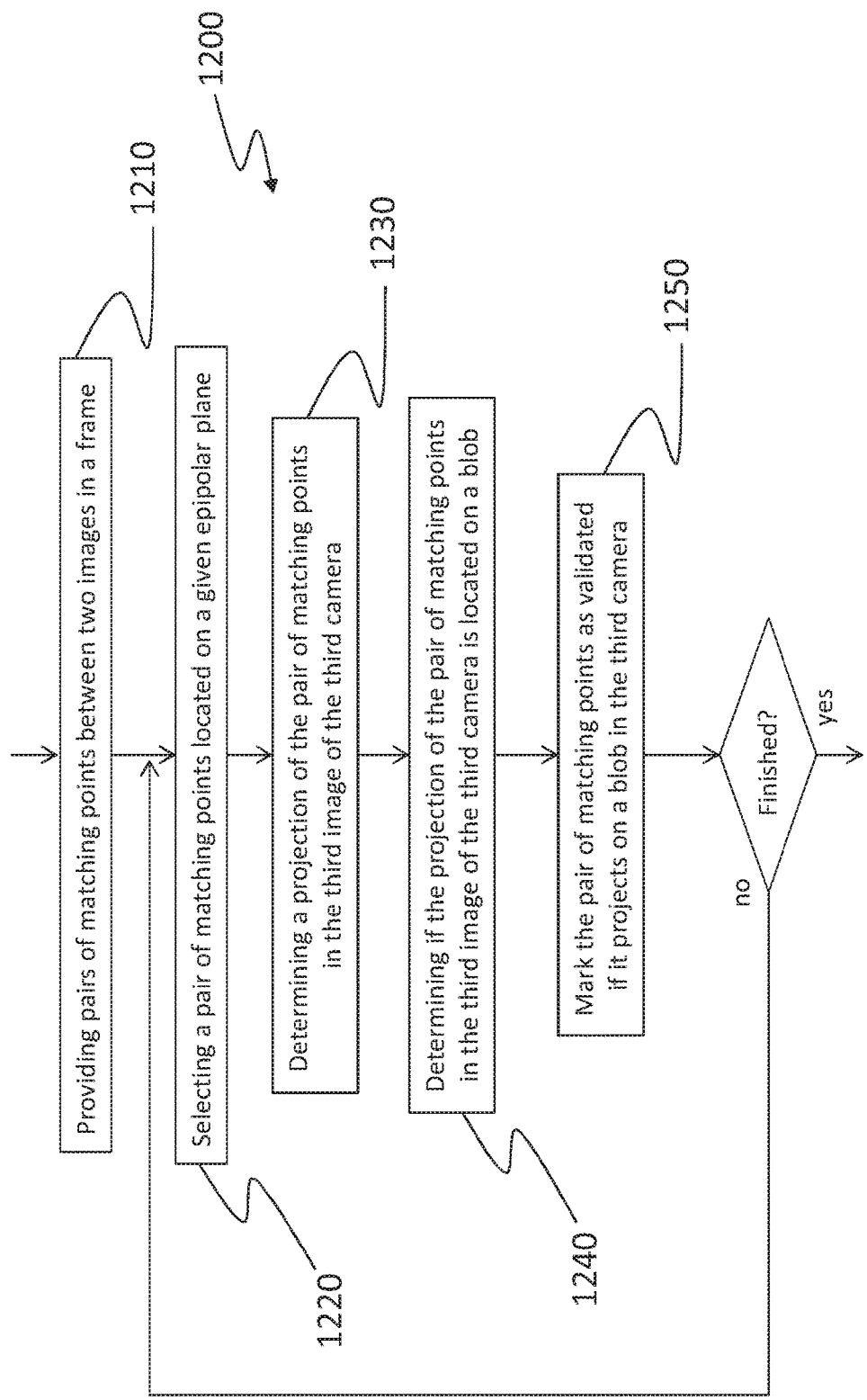
FIG. 12 is a flowchart of a computer-implemented method for validating matching points from three images of a scene.

FIG. 12 details this latter validation where each pair of matching points in the first two images of the current frame, also belonging to the most probable identified combination of extracted blobs, is validated.

According to step 1220 and after providing pairs of matching points between two images in a frame at step 1210, a pair of matching points located on a given epipolar plane is selected.

According to step 1230, a projection of the pair of matching points in the third image of the third camera is determined. As explained above, the projection coordinates in the third image can be either obtained after calculating the 3D point corresponding to the pair of matching points or after calculating the intersection of two conjugate epipolar lines when the cameras are not aligned.

One will then determine if the projection of the matching points in the third image is located on a blob or not according to step 1240.

According to step 1250, the pair of matching points is marked as validated if it projects on a blob in the third camera.

It will be appreciated that the validation is performed for all pairs of matching points.

Now referring back to FIG. 11 and according to step 1190, it will be appreciated that the validated pairs of matching points are provided.

Figure 13:
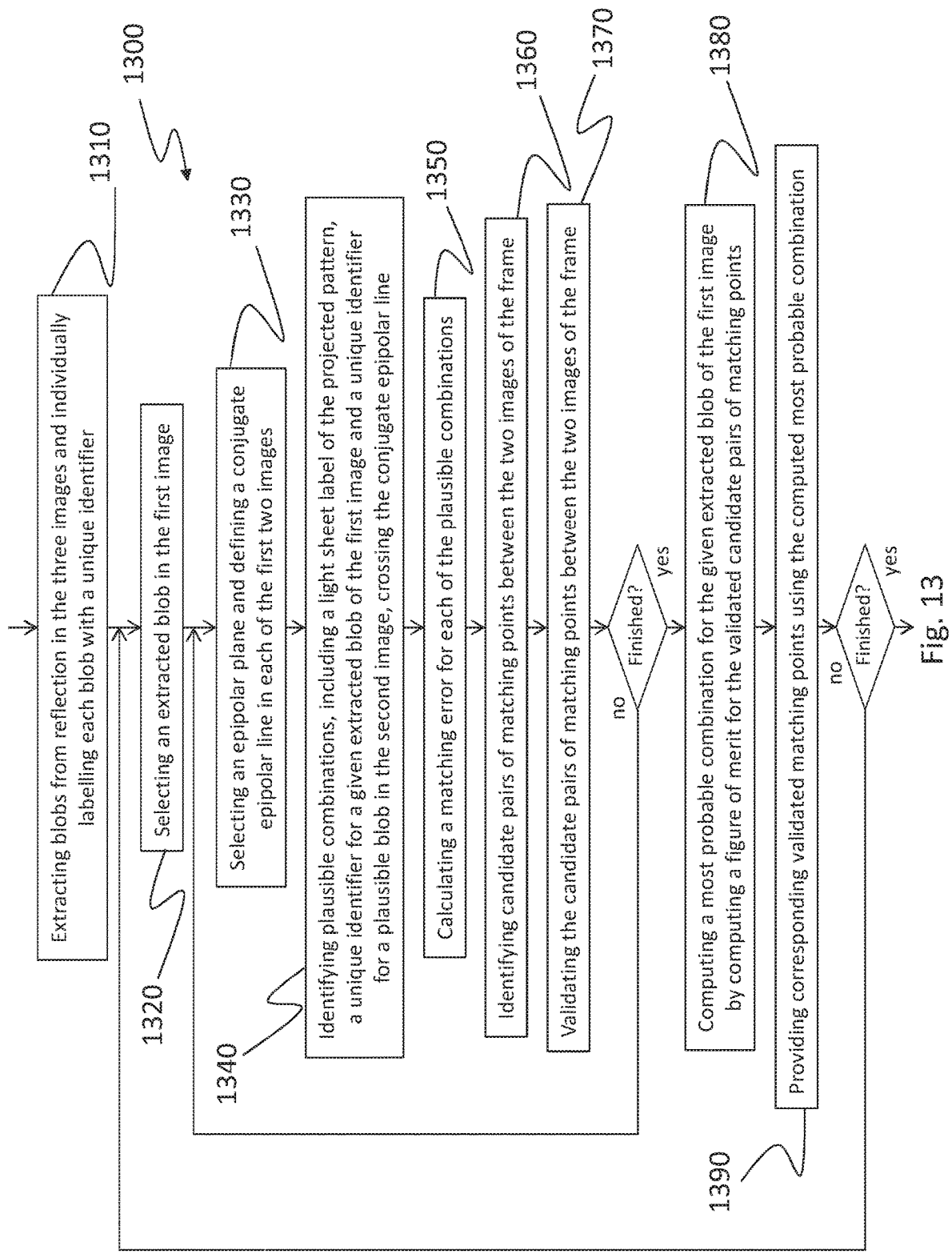
FIG. 13 is a flowchart of a computer-implemented method for matching points between three images of a scene while validating the matching pairs.

In another embodiment illustrated in FIG. 13, the same targeted process for providing validated matching points using the computed most probable combination of extracted blobs in three images, is presented.

According to step 1310, blobs are extracted in the three images as described above.

According to step 1320, an extracted blob is selected in the first image.

According to step 1330, an epipolar plane is selected from a set of epipolar planes and a conjugate epipolar line is defined in each of the first two images. The selected epipolar plane is defined by a center of projection of each of the first and the second cameras and an image point located on the given extracted blob.

According to step 1340, plausible combinations are identified including a light sheet label of the projected pattern, a unique identifier for a given extracted blob of the first image and a unique identifier for a plausible blob in the second image, crossing the conjugate epipolar line.

According to step 1350, a matching error is calculated for each of the plausible combinations. It will be appreciated that the matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light.

According to step 1360, candidate pairs of matching points between the two images of the frame are identified using the calculated matching error for each of the plausible combination.

According to step 1370, the candidate pairs of matching points are validated between the two images of the frame.

According to step 1380, a most probable combination is computed for the given extracted blob of the first image by computing a figure of merit for the validated pairs of matching points.

According to step 1390, corresponding matching points are provided using the computed most probable combination.

It will be appreciated that the validation step in the third image is accomplished within the inner loop at step 1370. In this case, the computation of the figure of merit for identifying the most probable combination for a given extracted blob of the first image, will be based on candidate pairs of matching points that have already been validated. Then, there is no need to validate in the third image afterwards.

Figure 14:
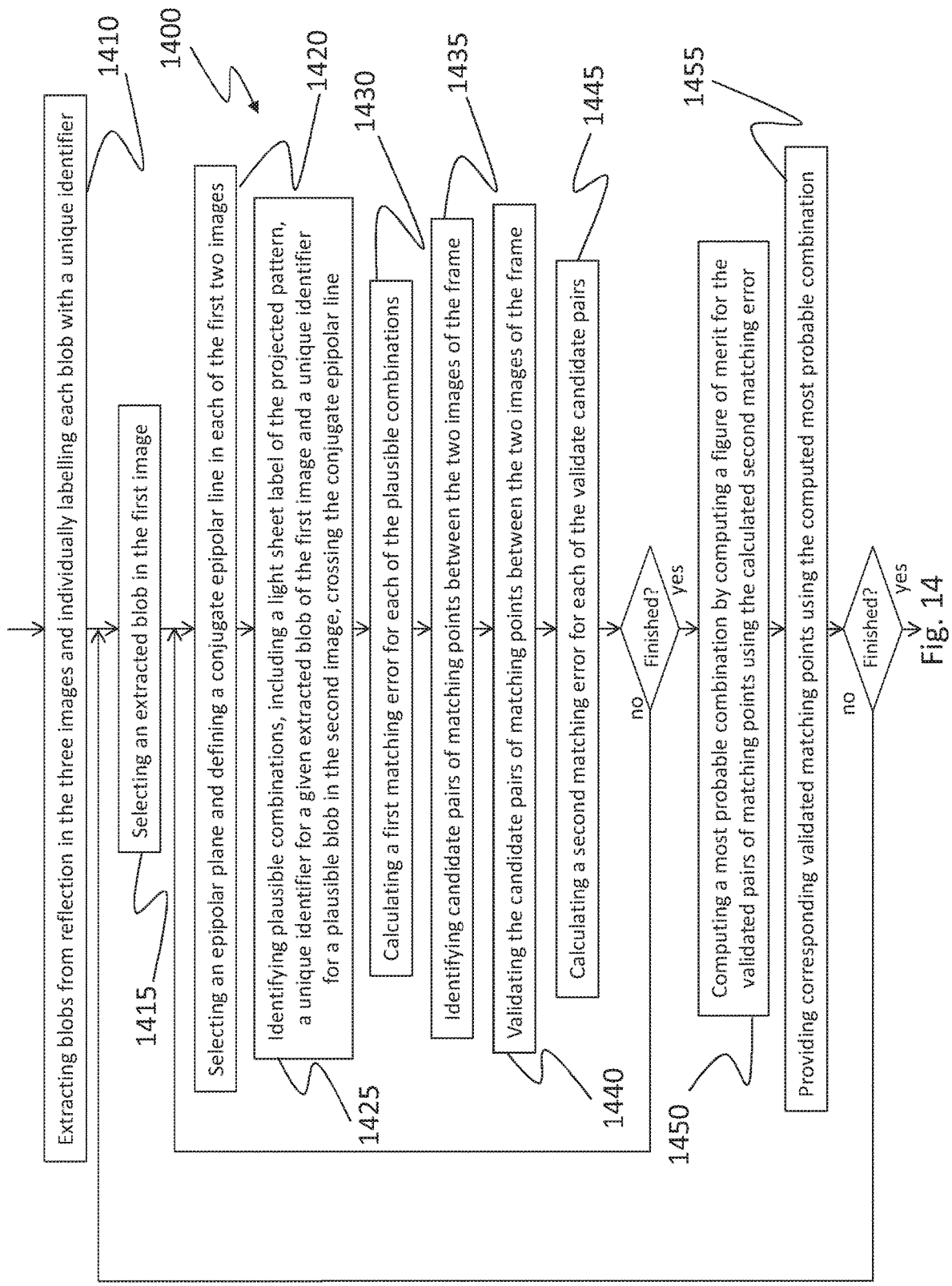
FIG. 14 is a flowchart of a computer-implemented method for matching points between three images of a scene while validating and reevaluating the matching pairs.

In still another embodiment illustrated in FIG. 14, the matching process described in FIG. 13 is modified by integrating step 1445 after validation in the inner loop.

More precisely, after extracting blobs from reflection in the three images and individually labeling each blob with a unique identifier at step 1410, and according to step 1415, an extracted blob is selected in the first image.

According to step 1420, an epipolar line is selected and a conjugate epipolar line is defined in each of the first two images. It will be appreciated that the selected epipolar plane of the set of epipolar planes is defined by a center of projection of each of the first and the second cameras and an image point located on the given extracted blob.

According to step 1425, plausible combinations are identified, including a light sheet label of the projected pattern, a unique identifier for a given extracted blob of the first image and a unique identifier for a plausible blob in the second image, the plausible blob crossing the conjugate epipolar line.

According to step 1430, a first matching error is calculated for each of the plausible combinations. It will be appreciated that the first matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light.

According to step 1435, candidate pairs of matching points are identified between the two images of the frame using the calculated first matching error for each of the plausible combinations.

According to step 1440, the candidate pairs of matching points are validated between the two images of the frame.

According to step 1445, a second matching error is calculated for each of the validated candidate pairs. It will be appreciated that the second matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from the center of projection of the third camera and reaches an intersection between the selected epipolar plane and a corresponding sheet of light of the at least one sheet of light.

According to step 1450, a most probable combination is computed by computing a figure of merit for the validated pairs of matching points using the calculated second matching error.

According to step 1455, corresponding validated matching points are provided using the computed most probable combination.

The additional step consists in calculating a second matching error for each of the plausible combinations. In the same way it is for the preceding embodiments, the second matching error of a plausible combination is indicative of a proximity between intersections of each pair among three rays. While the first ray originates from the center of projection of the first camera and reaches the extracted blob crossing the conjugate epipolar line in the first camera image, and a second ray originates from the center of projection of the second camera image before reaching the plausible blob crossing the conjugate epipolar line in the second camera image, the third ray originates either from the center of projection of the third camera image and reaches the projection of the pair of matching points in the third image, or from the center of projection of the projector before reaching an intersection between the selected epipolar plane and a corresponding sheet of light of the projector. Outside of the inner loop, at step 1450, the computation of the figure of merit for the validated pairs of matching points will be made using the calculated second matching error.

The method described above, and its variants do not impose to solely output the most probable combination for each blob in the reference image. One can compute and provide a list of the most probable combinations for each blob in the reference image before providing a list of matched points for each of these most probable combinations, each generated using the list of most probable combinations. This process, with the latest embodiment, is depicted in FIG. 15 where a list of most probable combinations is obtained after computing a figure of merit for the validated candidate pairs of matching points using the calculated second matching error at step 1550. Finally, a list of matched points for each of the most probable combinations is provided at 1555. This information can then be input into a global optimization method such as graph cuts, for instance, in order to evaluate the most probable set of combinations.

According to step 1510, blobs are extracted from reflection in the three images and each blob is individually labelled with a unique identifier.

According to step 1515, an extracted blob is selected in the first image.

According to step 1520, an epipolar plane is selected and a conjugate epipolar line is defined in each of the first two images.

According to step 1525, plausible combinations are identified, including a light sheet label of the projected pattern, a unique identifier for a given extracted blob of the first image and a unique identifier for a plausible blob in the second image, crossing the conjugate epipolar line.

According to step 1530, a first matching error is calculated for each of the plausible combinations.

According to step 1535, candidate pairs of matching points are identified between the two images in the frame.

According to step 1540, the candidate pairs of matching points are validated between the two images of the frame.

According to step 1545, a second matching error is calculated for each of the plausible combinations.

According to step 1550, a list of most probable combinations is computed by computing a figure of merit for the validated candidate pairs of matching points using the calculated second matching error.

According to step 1555, a list of matched points of the most probable combinations is provided.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, for example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop, a portable computer or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. Other mobile devices such as tablets, phablets, smartphones, personal digital assistants, portable computers, laptops, wearable computers, etc. suitable to execute the computer programs described herein could also be used.

Although the above description relates to example embodiments as presently contemplated by the inventors, it will be understood that the invention in its broad aspect includes equivalents and variants of the elements described herein. The embodiments described above are intended to be exemplary only. The scope of the invention is therefore intended to be limited solely by the appended claims.

The invention claimed is:

1. A computer-implemented method performed by at least one computer processor for matching points between three images of a scene, the method including:

retrieving three images acquired by a sensor, said sensor comprising at least a first camera, a second camera, a third camera and a light projector unit, two images comprising a first image and a second image of the three images being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera and the light projector unit are calibrated in a common coordinate system;

extracting blobs from said reflection in said two images and individually labeling said blobs with a unique identifier;

for each given extracted blob of the first image:
  selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob;
  identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line;
  calculating a matching error for each of the plausible combinations, wherein the matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light;
  repeating said steps of selecting, identifying and calculating for each epipolar plane of said set of epipolar planes;
  determining a most probable combination by computing a figure of merit for said plausible combinations using said matching error for each epipolar plane of said set of epipolar planes;
  identifying matching points between the two images in said frame using said determined most probable combination and the set of epipolar planes;

validating the matching points between the two images in said frame, said validating comprising:
for each pair of matching points located on a given epipolar plane,
determining a projection of the pair of matching points in the third image of the third camera,
determining if the projection of the pair of matching points in the third image of the third camera is located on a blob,
identifying the pair of matching points as validated if the projection of the pair of matching points in the third image of the third camera is located on the blob;
providing the validated pairs of matching points.

2. The computer-implemented method as claimed in claim 1, wherein the determining of a projection of the pair of matching points comprises computing 3D coordinates of the pair of matching points and determining a corresponding projected position in the third image of the third camera.

3. The computer-implemented method as claimed in claim 1, wherein the determining of a projection of the pair of matching points is performed by determining an intersection between a first given epipolar line and a second given epipolar line,
wherein the first given epipolar line is defined using an epipolar plane defined by the center of projection of the first camera, the center of projection of the third camera and the matching point in the first image; and
further wherein the second given epipolar line is defined using an epipolar plane defined by the center of projection of the second camera, the center of projection of the third camera and the matching point in the second image.

4. A computer-implemented method performed by at least one computer processor for matching points between three images of a scene, the method including:
retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system;
extracting blobs from said reflection in said two images and individually labeling said blobs with a unique identifier;
for each given extracted blob of the first image:
selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob;
identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line;
calculating a matching error for each of the plausible combinations, wherein the matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light;
identifying pairs of matching points between the two images in said frame using the calculated matching error for each of the plausible combination;
validating the pairs of matching points between the two images in said frame, said validating comprising:
for each pair of matching points located on the selected epipolar plane,
determining a projection of the pair of matching points in the third image of the third camera,
determining if the projection of the pair of matching points in the third image of the third camera is located on a blob,
identifying the pair of matching points as validated if the projection of the pair of matching points in the third image of the third camera is located on the blob;
repeating said steps of selecting, identifying, calculating, identifying and validating for each epipolar plane of said set of epipolar planes;
computing a most probable combination for the given extracted blob of the first image by computing a figure of merit for the validated pairs of matching points;
providing corresponding validated matching points using the computed most probable combination.

5. A computer-implemented method performed by at least one computer processor for matching points between three images of a scene, the method including:
retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system;

extracting blobs from said reflection in said two images and individually labeling said blobs with a unique identifier;

for each given extracted blob of the first image:

selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob;

identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line;

calculating a first matching error for each of the plausible combinations, wherein the first matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light;

identifying pairs of matching points between the two images in said frame using the calculated first matching error for each of the plausible combination;

validating the pairs of matching points between the two images in said frame, said validating comprising:

for each pair of matching points located on the selected epipolar plane, determining a projection of the pair of matching points in the third image of the third camera;

determining if the projection of the pair of matching points in the third image of the third camera is located on a blob, identifying the pair of matching points as validated if the projection of the pair of matching points in the third image of the third camera is located on the blob;

calculating a second matching error for each of the plausible combinations, wherein the second matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from the center of projection of the third camera and reaches an intersection between the selected epipolar plane and a corresponding sheet of light of the at least one sheet of light;

repeating said steps of selecting, identifying, calculating, identifying and validating for each epipolar plane of said set of epipolar planes;

computing a most probable combination by computing a figure of merit for the validated pairs of matching points using the calculated second matching error; and providing corresponding validated matching points using the computed most probable combination.

6. A computer-implemented method performed by at least one computer processor for matching points between three images of a scene, the method including:

retrieving three images acquired by a sensor, said sensor comprising at least a first camera, a second camera, a third camera and a light projector unit, two images of the three images comprising a first image and a second image being acquired by respectively the first camera and the second camera and a third image being acquired by the third camera, the light projector unit projecting a projected pattern onto said scene, said three images forming a frame captured at a single relative position between the scene and the sensor, said three images each containing a reflection of the projected pattern projected by the light projector unit on said scene, wherein the projected pattern comprises at least one sheet of light, each sheet of light being labelled with a corresponding light sheet label; wherein the first camera, the second camera and the third camera are calibrated in a common coordinate system;

extracting blobs from said reflection in said two images and individually labeling said blobs with a unique identifier;

for each given extracted blob of the first image:

selecting a selected epipolar plane from a set of epipolar planes and defining a conjugate epipolar line in each of said two images, wherein the selected epipolar plane of the set of epipolar planes is defined by a center of projection of each of the first and the second cameras and an image point located on the given extracted blob;

identifying plausible combinations, said plausible combinations including a light sheet label of said projected pattern, a unique identifier for the given extracted blob of the first image and a unique identifier for a plausible blob selected from said blobs in said second image, said plausible blob crossing the conjugate epipolar line;

calculating a first matching error for each of the plausible combinations, wherein the first matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from a center of projection of the light projector unit and reaches an intersection between the selected epipolar plane and a corresponding sheet of light of the at least one sheet of light;

identifying pairs of matching points between the two images in said frame using the calculated first matching error for each of the plausible combination;

validating the pairs of matching points between the two images in said frame, said validating comprising:
for each pair of matching points located on the selected epipolar plane,
determining a projection of the pair of matching points in the third image of the third camera,
determining if the projection of the pair of matching points in the third image of the third camera is located on a blob,
identifying the pair of matching points as validated if the projection of the pair of matching points in the third image of the third camera is located on the blob;
calculating a second matching error for each of the plausible combinations, wherein the second matching error of a given plausible combination is indicative of a proximity between intersections of each pair of three rays, wherein a first ray originates from the center of projection of the first camera and reaches the given extracted blob crossing the conjugate epipolar line in the first camera image, wherein a second ray originates from the center of projection of the second camera and reaches the plausible blob crossing the conjugate epipolar line in the second camera image and the third ray originates from the center of projection of the third camera and reaches an intersection between the selected epipolar plane and a corresponding sheet of light of the at least one sheet of light;
repeating said steps of selecting, identifying, calculating, identifying and validating for each epipolar plane of said set of epipolar planes;
computing a list of most probable combinations by computing a figure of merit for the validated pairs of matching points using the calculated second matching error; and
providing the list of the most probable combinations.

* * * * *